United States Patent
Yoshida et al.

(10) Patent No.: US 10,690,102 B2
(45) Date of Patent: Jun. 23, 2020

(54) INTERNAL-COMBUSTION ENGINE STARTING DEVICE, VEHICLE, AND INTERNAL-COMBUSTION ENGINE STARTING METHOD

(71) Applicant: HONDA MOTOR CO., LTD., Tokyo (JP)

(72) Inventors: Koji Yoshida, Wako (JP); Yuichi Masukake, Wako (JP); Atsuki Iwamitsu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/579,225

(22) PCT Filed: Jun. 11, 2015

(86) PCT No.: PCT/JP2015/066916
§ 371 (c)(1),
(2) Date: Dec. 4, 2017

(87) PCT Pub. No.: WO2016/199275
PCT Pub. Date: Dec. 15, 2016

(65) Prior Publication Data

US 2018/0180012 A1 Jun. 28, 2018

(51) Int. Cl.
*F02N 11/08* (2006.01)
*B60W 10/06* (2006.01)
(Continued)

(52) U.S. Cl.
CPC ............... *F02N 11/08* (2013.01); *B60K 6/44* (2013.01); *B60K 6/448* (2013.01); *B60K 6/485* (2013.01);
(Continued)

(58) Field of Classification Search
CPC .. B60K 2006/4825; B60K 6/44; B60K 6/448; B60K 6/485; B60K 6/52; B60K 6/54;
(Continued)

(56) References Cited

U.S. PATENT DOCUMENTS 5,491,635 A  2/1996 Foeldi et al.
8,515,608 B2  8/2013 Yamagata
(Continued)

FOREIGN PATENT DOCUMENTS

JP  7-52685 A  2/1995
JP  2001-227438 A  8/2001
(Continued)

OTHER PUBLICATIONS

Machine Translation of JP2011047348A PDF file Name: "JP2011047348A_Machine_Translation.pdf".*
(Continued)

*Primary Examiner* — Phutthiwat Wongwian
*Assistant Examiner* — Ruben Picon-Feliciano
(74) *Attorney, Agent, or Firm* — Westerman, Hattori, Daniels & Adrian, LLP

(57) ABSTRACT

Provided is an internal-combustion engine starting device in which a control unit controls a motor to realize a first starting mode of starting an internal-combustion engine by increasing a rotation speed of the internal-combustion engine to a predetermined first rotation speed NE1 by the motor and a second starting mode of starting the internal-combustion engine by increasing the rotation speed of the internal-combustion engine to a second rotation speed NE2 set higher than the first rotation speed NE1 and set based on a temperature of a coolant by the motor.

7 Claims, 10 Drawing Sheets

(51) Int. Cl.
*B60W 10/08* (2006.01)
*B60K 6/54* (2007.10)
*B60W 20/00* (2016.01)
*B60K 6/485* (2007.10)
*B60K 6/44* (2007.10)
*B60L 15/20* (2006.01)
*B60W 20/40* (2016.01)
*B60K 6/52* (2007.10)
*B60K 6/448* (2007.10)
*B60L 50/16* (2019.01)
*B60L 50/15* (2019.01)
*B60L 58/12* (2019.01)
*F02N 11/04* (2006.01)
*F02D 29/02* (2006.01)
*B60K 6/48* (2007.10)

(52) U.S. Cl.
CPC .............. *B60K 6/52* (2013.01); *B60K 6/54* (2013.01); *B60L 15/20* (2013.01); *B60L 50/15* (2019.02); *B60L 50/16* (2019.02); *B60W 10/06* (2013.01); *B60W 10/08* (2013.01); *B60W 20/00* (2013.01); *B60W 20/40* (2013.01); *F02N 11/0818* (2013.01); *F02N 11/0862* (2013.01); *B60K 2006/4825* (2013.01); *B60L 2220/42* (2013.01); *B60L 2240/12* (2013.01); *B60L 2240/14* (2013.01); *B60L 2240/36* (2013.01); *B60L 2240/441* (2013.01); *B60L 2240/445* (2013.01); *B60L 2240/54* (2013.01); *B60L 2240/547* (2013.01); *B60L 2240/549* (2013.01); *B60W 2510/0676* (2013.01); *B60W 2710/081* (2013.01); *F02D 29/02* (2013.01); *F02N 11/04* (2013.01); *F02N 2200/022* (2013.01); *F02N 2200/023* (2013.01); *F02N 2200/061* (2013.01); *F02N 2200/0801* (2013.01); *F02N 2200/0802* (2013.01); *F02N 2200/102* (2013.01); *F02N 2300/102* (2013.01); *F02N 2300/104* (2013.01); *F02N 2300/2002* (2013.01); *Y02T 10/6243* (2013.01); *Y02T 10/6252* (2013.01); *Y02T 10/6265* (2013.01); *Y02T 10/6286* (2013.01)

(58) Field of Classification Search
CPC ...... B60L 11/12; B60L 11/14; B60L 11/1861; B60L 15/20; B60L 2220/42; B60L 2240/12; B60L 2240/14; B60L 2240/36; F02D 29/02; F02N 11/04; F02N 11/08; F02N 11/0818; F02N 11/0862; F02N 2200/022; F02N 2200/023; F02N 2200/061; F02N 2200/0801; F02N 2200/0802; F02N 2200/102; F02N 2300/102; F02N 2300/104
See application file for complete search history.

(56) References Cited

U.S. PATENT DOCUMENTS

| 2008/0129049 | A1  | 6/2008  | Sauvlet et al. |
| 2012/0303194 | A1* | 11/2012 | Muta ............... B60K 6/445 701/22 |
| 2013/0131902 | A1  | 5/2013  | Yamagata |
| 2015/0051819 | A1  | 2/2015  | Ellis et al. |

FOREIGN PATENT DOCUMENTS

| JP | 2004-52693 | A |   | 2/2004 |
| JP | 2010-77859 | A |   | 4/2010 |
| JP | 2011047348 | A | * | 3/2011 |
| JP | 2013-169857 | A |   | 9/2013 |
| JP | 2013-231388 | A |   | 11/2013 |
| JP | 2014-166836 | A |   | 9/2014 |
| WO | 2012/053601 | A1 |   | 4/2012 |

OTHER PUBLICATIONS

International Search Report dated Aug. 18, 2015, issued in Counterpart of International Application No. PCT/JP2015/066916 (2 pages).
Notification of Reasons for Refusal dated Jul. 17, 2018, issued in counterpart Japanese Application No. 2017-523052, with English machine translation. (6 pages).

* cited by examiner

INTERNAL-COMBUSTION ENGINE STARTING DEVICE, VEHICLE, AND INTERNAL-COMBUSTION ENGINE STARTING METHOD

TECHNICAL FIELD

The present invention relates to an internal-combustion engine starting device of a hybrid vehicle, a vehicle including the internal-combustion engine starting device, and an internal-combustion engine starting method.

BACKGROUND ART

Conventionally, a hybrid vehicle which generates power by a combination of a motor and an engine corresponding to an internal-combustion engine and transmits the power to drive wheels is known. In the hybrid vehicle, the motor is used as a starter at the time of starting the internal-combustion engine. The starting of the internal-combustion engine is performed by starting an ignition after driving the internal-combustion engine by the motor within a short time. A method of preventing a driver from feeling uncomfortable due to a sound generated at this time is proposed (for example, see Patent Document 1). In Patent Document 1, the discomfort of the driver is prevented by using the sound generated at the time of starting the internal-combustion engine as a sporty sound in such a manner that a rotation speed overshoot intentionally exceeding a target rotation speed corresponding to a current rotation speed of an electric motor occurs at the time of starting the internal-combustion engine.

Patent Document 1: U.S. Published Patent Application Publication, No. 2008/0129049, Specification

DISCLOSURE OF THE INVENTION

Problems to be Solved by the Invention

However, in the technique disclosed in Patent Document 1, the rotation speed overshoot is only described as 200 to 500 rpm and a detailed description for making the sporty sound at the time of starting the internal-combustion engine is not made. The starting sound of the internal-combustion engine depends on whether the rotation speed is high or low and the state of the internal-combustion engine at the time of starting the internal-combustion engine is not uniform. Thus, an unpleasant acoustic effect will be rather obtained and then the discomfort will be given to the driver unless an appropriate target rotation speed is set based on the state of the internal-combustion engine. On the contrary, it is not easy to appropriately set the target rotation speed based on the state of the internal-combustion engine to prevent the discomfort of the driver without the description of Patent Document 1.

An object of the invention is to provide an internal-combustion engine starting device capable of exhibiting a sporty acoustic effect by appropriately setting a target rotation speed based on a state of an internal-combustion engine at the time of starting the internal-combustion engine, a vehicle including the internal-combustion engine starting device, and an internal-combustion engine starting method.

Means for Solving the Problems

In order to achieve the above-described object, the invention provides an internal-combustion engine starting device including: an internal-combustion engine unit which includes an internal-combustion engine (for example, an internal-combustion engine 4 to be described later), a cooling unit cooling the internal-combustion engine by a coolant, a temperature acquiring unit (for example, a water temperature sensor 92 to be described later) acquiring a temperature of the coolant, and a rotation speed acquiring unit (for example, a crank angle sensor 91 to be described later) acquiring a rotation speed of the internal-combustion engine; and a motor unit which includes a motor (for example, a motor 5 to be described later) starting the internal-combustion engine and a control unit (for example, an ECU 6 to be described later) controlling the motor, wherein the control unit controls the motor to realize a first starting mode of starting the internal-combustion engine by increasing the rotation speed of the internal-combustion engine to a predetermined first rotation speed (for example, a first rotation speed NE1 to be described later) and a second starting mode of starting the internal-combustion engine by increasing the rotation speed of the internal-combustion engine to a second rotation speed (for example, a second rotation speed NE2 to be described later) set higher than the first rotation speed and set based on the temperature of the coolant by the motor.

In the invention, the second rotation speed is set as the target rotation speed in the second starting mode of starting the internal-combustion engine based on the temperature of the coolant constituting the state of the internal-combustion engine. Accordingly, it is possible to easily realize the higher second rotation speed in the second starting mode. Since the sound generated at the time of starting the internal-combustion engine can be made sporty by further increasing a difference between the first rotation speed and the second rotation speed, the acoustic effect can be improved. When the second rotation speed is set without considering the temperature of the coolant, a low rotation speed difference is set to about 200 rpm to 500 rpm as disclosed in Patent Document 1 or a high rotation speed difference is set to cause a control failure. However, since the second rotation speed of the second starting mode of starting the internal-combustion engine is set based on the temperature of the coolant as described above, a high rotation speed difference of 1,500 to 2,000 rpm to maximum can be realized without setting the rotation speed difference between the first rotation speed and the second rotation speed to a low value and causing the control failure. As a result, since the driver can imagine the sporty driving of the vehicle to be driven from the sound generated at the time of starting the internal-combustion engine before the driving, the driver can expect fun driving.

In this case, the control unit (for example, an ECU 6 to be described later) may control the motor (for example, a motor 5 to be described later) to set a rotation speed difference between the first rotation speed (for example, a first rotation speed NE1 to be described later) and the second rotation speed (for example, a second rotation speed NE2 to be described later) to a value based on the temperature of the coolant.

In the invention, the control unit consequently sets the rotation speed difference between the first rotation speed (for example, a first rotation, speed NE1 to be described later) and the second rotation speed (for example, a second rotation speed NE2 to be described later) based on the temperature of the coolant. Accordingly, it is possible to easily set the rotation speed difference between the first rotation speed and the second rotation speed to be large with certainty. When the rotation speed difference between the first rotation speed and the second rotation speed is set without considering the temperature of the coolant, a low rotation speed difference is set to about 200 rpm to 500 rpm as disclosed in Patent Document 1 or a high rotation speed difference is set to cause a control failure. However, since the rotation speed difference between the first rotation speed and the second rotation speed is set based on the temperature of the coolant as described above, a high rotation speed difference of 1,500 to 2,000 rpm to maximum can be realized without setting the rotation speed difference to a low value and causing the control failure.

In this case, the control unit (for example, an ECU 6 to be described later) may increase and set the second rotation speed based on the temperature of the coolant in a region in which the temperature of the coolant is equal to or higher than a predetermined first temperature (for example, a predetermined temperature $TW_{thre1}$ to be described later) and is equal to or lower than a second temperature (for example, a predetermined temperature $TW_{thre2}$ to be described later) higher than the first temperature.

In the invention, the second rotation speed of the second starting mode is set to increase as the temperature of the coolant increases based on the temperature of the coolant in a region in which the temperature of the coolant is equal to or higher than the predetermined first temperature and is equal to or lower than the second temperature higher than the first temperature. Accordingly, since it is possible to easily realize the higher second rotation speed in the second starting mode, it is possible to further improve the acoustic effect at the time of starting the internal-combustion engine. When the temperature of the coolant is not considered, a low rotation speed difference is set to about 200 rpm to 500 rpm as disclosed in Patent Document 1 or a high rotation speed difference is set to cause a control failure. However, since the second rotation speed of the second starting mode is set to increase as the temperature of the coolant increases based on the temperature of the coolant as described above, a high rotation speed difference of 1,500 to 2,000 rpm to maximum can be realized without setting the rotation speed difference between the first rotation speed and the second rotation speed to a low value and causing the control failure.

In this case, the control unit (for example, an ECU 6 to be described later) may set the second rotation speed (for example, a second rotation speed NE2 to be described later) to a constant value in a region in which the temperature of the coolant exceeds the second temperature (for example, a predetermined temperature $TW_{thre2}$ to be described later).

In the invention, the second rotation speed is set to a constant value in a region in which the temperature of the coolant exceeds the second temperature. Accordingly, since it is possible to set the high rotation speed which is constant at all times as the second rotation speed of the second starting mode in a region in which the temperature of the coolant exceeds the second temperature, it is possible to exhibit a uniform acoustic effect at the time of starting the internal-combustion engine. For this reason, it is possible to stably give a sporty feeling to the driver at all times without discomfort whenever starting the internal-combustion engine.

Further, in this case, the control unit (for example, an ECU 6 to be described later) may set the second rotation speed (for example, a second rotation speed NE2 to be described later) to be equal to or higher than a predetermined lower-limit rotation speed and equal to or lower than a predetermined upper-limit rotation speed in a region in which the temperature of the coolant exceeds the second temperature (for example, a predetermined temperature $TW_{thre2}$ to be described later).

In the invention, the second rotation speed is set to be equal to or higher than a predetermined lower-limit rotation speed and equal to or lower than a predetermined upper-limit rotation speed in a region in which the temperature of the coolant exceeds the second temperature. Accordingly, since it is possible to set the high rotation speed which is constant at all times as the second rotation speed of the second starting mode in a region in which the temperature of the coolant exceeds the second temperature, it is possible to exhibit the same acoustic effect at the time of starting the internal-combustion engine. For this reason, it is possible to stably give a sporty feeling to the driver at all times without discomfort whenever starting the internal-combustion engine.

In this case, the control unit (for example, an ECU 6 to be described later) may control the motor (for example, a motor 5 to be described later) to prohibit the realization of the second starting mode in a region in which the temperature of the coolant is lower than the first temperature (for example, a predetermined temperature $TW_{thre1}$ to be described later).

In the invention, the realization of the second starting mode is prohibited in a region in which the temperature of the coolant is lower than the first temperature. Accordingly, it is possible to prohibit the internal-combustion engine from starting with a high rotation despite the low temperature of the coolant and to protect the internal-combustion engine.

Further, in this case, the control unit may control the motor (for example, a motor 5 to be described later) to prohibit the realization of the second starting mode in a region in which the temperature of the coolant is lower than the first temperature (for example, a predetermined temperature TWthre1 to be described later) by a predetermined temperature.

In the invention, the realization of the second starting mode is prohibited in a region in which the temperature of the coolant is lower than the first temperature by a predetermined temperature. Accordingly, it is possible to prohibit the internal-combustion engine from starting with a high rotation despite the low temperature of the coolant and to protect the internal-combustion engine.

In this case, the internal-combustion engine starting device may further include a storage battery unit which includes a storage battery (for example, a battery 9 to be described later) outputting electric power to a motor and a limit rotation speed calculating unit (for example, a limit rotation speed calculating unit 65 to be described later) calculating a limit rotation speed of the motor (for example, a motor 5 to be described later) based on an electric power output limit value of the storage battery, wherein the control unit (for example, an ECU 6 to be described later) may control the motor so that an increase degree of the second rotation speed (for example, a second rotation speed NE2 to be described later) becomes smaller than an increase degree of the limit rotation speed in a region in which the temperature of the coolant is equal to or higher than the first temperature (for example, a predetermined temperature $TW_{thre1}$ to be described later) or equal to or lower than the second temperature (for example, a predetermined temperature $TW_{thre2}$ to be described later).

In the invention, a differential value of the target rotation speed determined from the electric power output limit value of the storage battery is larger than a differential value of the second rotation speed of the second starting mode. In other words, an increase rate of the second rotation speed of the second starting mode increasing in accordance with an increase in temperature of the coolant is smaller than an increase rate of the target rotation speed determined from the electric power output limit value of the storage battery increasing in accordance with an increase in temperature of the coolant. Accordingly, since it is possible to prevent the setting of the second rotation speed exceeding the target rotation speed determined from the electric power output limit value of the storage battery, it is possible to set the second rotation speed in the stable second starting mode.

In this case, the internal-combustion engine (for example, an internal-combustion engine 4 to be described later) may further include a selection unit (for example, a starting mode selection switch 112 to be described later) supplying driving power to the vehicle wheel (for example, a vehicle wheel Wr to be described later) of the vehicle (for example, a vehicle 3 to be described later) and changing the operation characteristic of the vehicle and the control unit (for example, an ECU 6 to be described later) may set a second rotation speed (for example, a second rotation speed NE2 to be described later) based on the operation characteristic of the vehicle.

In the invention, the second rotation speed of the second starting mode is set based on the selection, unit changing the operation characteristic of the vehicle. Accordingly, it is possible to exhibit the acoustic effect in response to the operation characteristic of the vehicle selected by the selection unit. Further, since the mode selected by the selection unit is synchronized with the acoustic effect generated at the time of starting the internal-combustion engine, it is possible to improve the satisfaction of the driver with respect to the request (the sporty vehicle behavior) of the driver.

In this case, the control unit (for example, an ECU 6 to be described later) may control the motor (for example, a motor 5 to be described later) to prohibit the realization of the second starting mode when a difference between the second rotation speed (for example, a second rotation speed NE2 to be described later) and the first rotation speed (for example, a first rotation speed NE1 to be described later) set based on the temperature of the coolant is a predetermined value or less.

In the invention, the realization of the second starting mode is prohibited when a difference between the second rotation speed and the first rotation speed is a predetermined value or less. Accordingly, it is possible to prevent the acoustic effect of the starting sound of the internal-combustion engine which is not sporty and does not satisfy the driver of the vehicle. Thus, it is possible to prevent a case where the satisfaction of the owner of the vehicle with respect to the vehicle is impaired. That is, it is possible to prevent a case where the pride of the owner of the vehicle is impaired by owning a sporty luxury car.

Further, the vehicle (for example, a vehicle 3 to be described later) of the invention includes the internal-combustion engine starting device. In the invention, since the sound generated at the time of starting the internal-combustion engine of the vehicle can be made sporty by further increasing a difference between the first rotation speed and the second rotation speed, the acoustic effect can be improved. When the second rotation speed is set without considering the temperature of the coolant, a low rotation speed difference is set to about 200 rpm to 500 rpm as disclosed in Patent Document 1 or a high rotation speed difference is set to cause a control failure. However, since the second rotation, speed of the second starting mode of starting the internal-combustion engine is set based on the temperature of the coolant as described above, a high rotation speed difference of 1,500 to 2,000 rpm to maximum can be realized without setting the rotation speed difference between the first rotation speed and the second rotation speed to a low value and causing the control failure. As a result, since the driver can imagine the sporty driving of the vehicle to be driven from the sound generated at the time of starting the internal-combustion engine before the driving, the driver can expect fun driving.

Further, an internal-combustion, engine starting method according to the invention selectively realizes a first starting mode of starting an internal-combustion engine by increasing a rotation speed of the internal-combustion engine (for example, an internal-combustion engine 4 to be described later) to a predetermined first rotation speed (for example, a first rotation speed NE1 to be described later) by a motor (for example, a motor 5 to be described later) and a second starting mode of starting the internal-combustion engine by increasing the rotation speed of the internal-combustion engine to a second rotation speed (for example, a second rotation speed NE2 to be described later) set higher than the first rotation speed and set based on a temperature of a coolant by the motor.

In the invention, the second rotation speed of the second starting mode of starting the internal-combustion engine is set based on the temperature of the coolant. Accordingly, it is possible to easily realize the higher second rotation speed in the second starting mode. Since the sound generated at the time of starting the internal-combustion engine can be made sporty by further increasing a difference between the first rotation speed and the second rotation speed, the acoustic effect can be improved. When the second rotation speed is set without considering the temperature of the coolant, a low rotation speed difference is set to about 200 rpm to 500 rpm as disclosed in Patent Document 1 or a high rotation speed difference is set to cause a control failure. However, since the second rotation speed of the second starting mode of starting the internal-combustion engine is set based on the temperature of the coolant as described above, a high rotation speed difference of 1,500 to 2,000 rpm to maximum can be realized without setting the rotation speed difference between the first rotation speed and the second rotation speed to a low value and causing the control failure. As a result, since the driver can imagine the sporty driving of the vehicle to be driven from the sound generated at the time of starting the internal-combustion engine before the driving, the driver can expect fun driving.

Effects of the Invention

According to the invention, it is possible to provide an internal-combustion engine starting device capable of exhibiting a sporty acoustic effect by appropriately setting a target rotation speed based on a state of an internal-combustion engine at the time of starting the internal-combustion engine, a vehicle including the internal-combustion engine starting device, and an internal-combustion engine starting method.

BRIEF DESCRIPTION OF THE DRAWINGS

FIG. 3 is a functional block diagram illustrating a configuration of an ECU 6 according to the embodiment of the invention.

PREFERRED MODE FOR CARRYING OUT THE INVENTION

Figure 1:
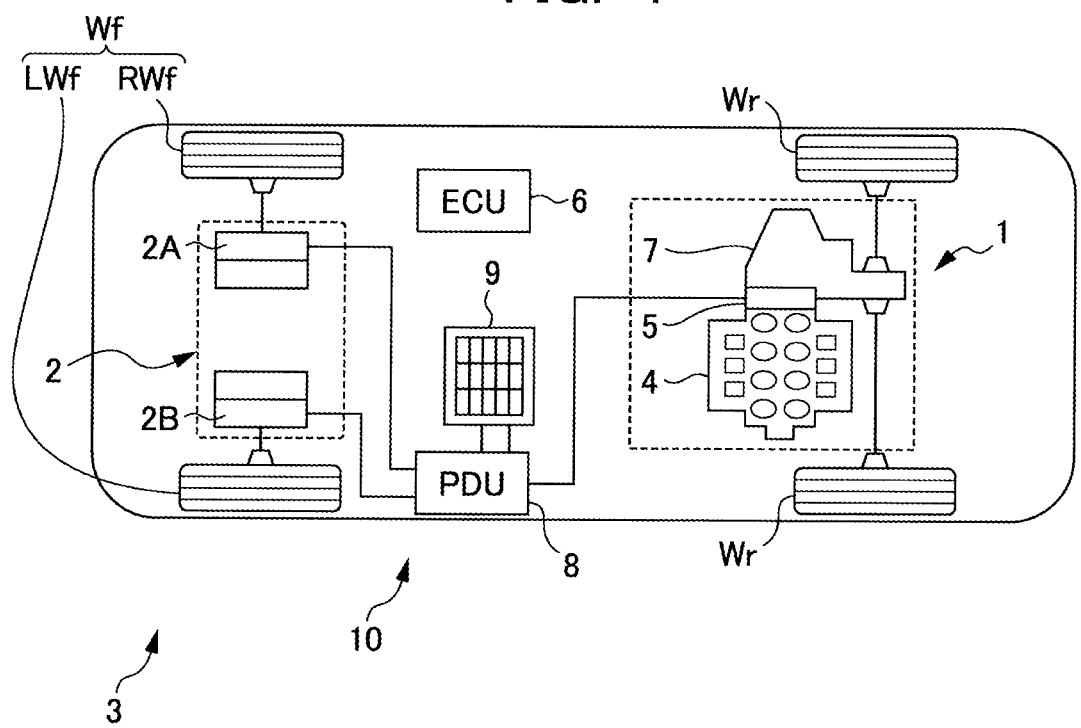
FIG. 1 is a diagram illustrating a vehicle 3 equipped with an internal-combustion engine starting device according to an embodiment of the invention.
Figure 2:
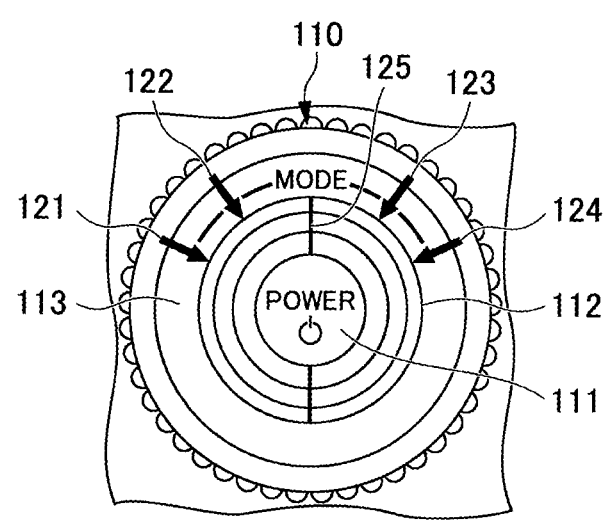

Hereinafter, an embodiment of the invention will be described in detail with reference to the drawings. FIG. 1 is a diagram illustrating a vehicle 3 equipped with an internal-combustion engine starting device according to an embodiment of the invention. FIG. 2 is a diagram illustrating an ignition switch 110 and a starting mode selection switch 112 in the internal-combustion engine starting device according to the embodiment of the invention. A vehicle 3 including the internal-combustion engine starting device according to the embodiment is a hybrid vehicle. As illustrated in FIG. 1, the vehicle 3 includes a first driving device 1, a second driving device 2, an electronic control unit (hereinafter, referred to as an "ECU 6") 6 which is a control device constituting a control unit for controlling these driving devices, a power drive unit (PDU) 8, and a battery 9.

The first driving device 1 is provided at the rear part of the vehicle 3 and drives rear wheels Wr and Wr corresponding to first drive wheels. The first driving device 1 includes an internal-combustion engine (ENG) 4, a motor 5, and a transmission 7. The internal-combustion engine 4 and the motor 5 are connected in series to each other and the torque generated by the internal-combustion engine 4 and the motor 5 is transmitted to the rear wheels Wr and Wr through the transmission 7.

The internal-combustion engine 4 is, for example, a V-type six-cylinder engine and generates a torque for causing the hybrid vehicle 3 to travel by burning a fuel. The crank shaft of the internal-combustion engine 4 is directly connected to the output shaft of the motor 5 without a clutch.

The internal-combustion engine 4 includes a crank angle sensor 91 (see FIG. 3) serving as a rotation speed acquiring unit. The crank angle sensor 91 acquires the rotation speed of the internal-combustion engine 4. Specifically, the crank angle sensor 91 outputs a pulse signal to the ECU 6 every predetermined crank angle in response to the rotation of a crank shaft (not illustrated) of the internal-combustion engine 4. In the ECU 6, the actual rotation speed of the internal-combustion engine 4 is acquired based on the output of the crank angle sensor 91. Further, the internal-combustion engine 4 includes a water temperature sensor 92 serving as a temperature acquiring unit. The water temperature sensor 92 acquires a temperature of a coolant. Specifically, the water temperature sensor 92 outputs a detection signal substantially proportional to a temperature (hereinafter, referred to as a "water temperature") of cooling water corresponding to a coolant flowing in a cooling water path (not illustrated) formed in a cylinder block of the internal-combustion engine 4 to the ECU 6.

The internal-combustion engine 4, the crank angle sensor 91 serving as the rotation speed acquiring unit, the water temperature sensor 92 serving as the temperature acquiring unit, and the ECU 6 constitute an internal-combustion engine unit. The internal-combustion engine 4 supplies driving power to the vehicle wheels (the rear wheels Wr and Wr) of the vehicle 3. Further, the cooling water path (not illustrated) formed in the cylinder block of the internal-combustion engine 4 communicates with a radiator and these members constitute a cooling unit that cools the internal-combustion engine 4 by a coolant.

The motor 5 starts the internal-combustion engine 4. The motor 5 is specifically, for example, a three-phase AC motor and generates a torque for causing the vehicle 3 to travel by electric power stored in the battery 9 serving as a storage battery. That is, the battery 9 outputs electric power to the motor 5 and outputs electric power to the ECU 6 and the PDU 8. The motor 5 is connected to the battery 9 via the PDU 8 including an inverter and assists the driving power of the internal-combustion engine 4. Further, the motor 5 is used as a starter at the time of starting the internal-combustion engine 4. The motor 5 is controlled by a control signal from the ECU 6 so that sporty sound starting (hereinafter, referred to as "S/S starting") or general starting (hereinafter, referred, to as "normal starting") of the internal-combustion engine 4 to be described later is performed. The motor 5 and the ECU 6 constitute a motor unit.

Further, the ECU 6 constitutes a capacity acquiring unit 61 which acquires a capacity which is usable in the battery 9. The ECU 6 determines whether to perform an EV traveling state in which the vehicle 3 travels only by the motor 5 or to cause the vehicle 3 to travel by the internal-combustion engine 4 based on the acquired usable capacity of the battery 9. Further, the ECU 6 constitutes a determination unit 62 which determines whether the vehicle 3 currently travels in the EV traveling state or by the internal-combustion engine 4. Further, the ECU 6 constitutes a traveling state acquiring unit 63 which acquires the traveling state of the vehicle 3, that is, an EV stop state, an EV sailing state, an EV deceleration state, and the like in the EV traveling state. Further, the ECU 6 constitutes a shift state acquiring unit 64 which acquires information on the position of the transmission 7 at any one of gear shift states including a parking position, a neutral position, a drive position, and the like. Further, the ECU 6 constitutes a limit rotation speed calculating unit 65 which calculates a limit rotation speed BL of the motor 5 based on an electric power output limit value of the battery 9 obtained from the usable capacity of the battery 9 and constitutes a storage battery unit together with the battery Further, the ECU 6 receives an actual speed and acceleration of the vehicle 3 which is acquired by a vehicle speed sensor unit 93 and is output to the ECU 6.

The transmission 7 corresponding to the gear shifting unit converts at least one input from the torque generated by the internal-combustion engine 4 and the torque generated by the motor 5 into a rotation speed and a torque with a desired gear shift ratio and transmits the rotation speed and the torque to the rear wheels Wr and Wr.

The second driving device 2 is provided at a front part of the vehicle 3 and drives front wheels Wf (RWf and LWf) serving as second drive wheels. The second driving device 2 includes motors 2A and 2B. A torque of the motors 2A and 2B is transmitted to the front wheels Wf (RWf and LWf).

The motors 2A and 2B are, for example, three-phase AC motors similarly to the motor 5 and generate a torque for causing the vehicle 3 to travel by electric power stored in the battery 9. Further, the motors 2A and 2B are connected to the battery 9 via the PDU 8 including the inverter and a control signal from the ECU 6 is input to the PDU 8 so that the supply of electric power from the battery 9 and the regeneration of the energy in the battery 9 are controlled.

In addition, each of the rear wheels Wr and Wr and the front wheels Wf (RWf and LWf) is provided with a friction brake (not illustrated). The friction brake is configured as, for example, a hydraulic disk brake. When a driver steps on a brake pedal, a stepping amount, that is, a stepping force in response to an operation amount is transmitted to a brake pad through a hydraulic cylinder or the like in an amplified state and a friction force is generated between the brake pad and the brake dish attached to each drive wheel, so that each drive wheel is braked.

The starting of the internal-combustion engine 4 is performed by the ignition switch 110 including a button switch 111 illustrated in FIG. 2 and disposed at a center console. The ignition switch 110 constitutes an activation unit which requires the activation of the internal-combustion engine 4. The switching of "S/S starting" and "normal starting" at the time of starting the internal-combustion engine 4 is performed by operating an annular starting mode selection switch 112 serving as a selection unit for changing the operation characteristic of the vehicle 3 and provided to surround the button switch 111 for starting the internal-combustion engine 4. The starting mode selection switch 112 is rotatable around the circular button switch 111 coaxially with the button switch 111. Switching positions of a first mode 121, a second mode 122, a third mode 123, and a fourth mode 124 are displayed from the left side in the annular display unit 113 disposed to surround the outer periphery of the starting mode selection switch 112. When the starting mode selection switch 112 is rotated about the button switch 111 and an instruction line 125 displayed on the starting mode selection switch 112 is aligned to each switching position of the mode, the corresponding mode is selected. The starting mode selection switch 112 allows the switching to the operation mode in which the operation characteristic of the vehicle 3 is superior to the currently selected operation mode and the operation mode in which the operation characteristic of the vehicle 3 is inferior to the currently selected operation mode. For example, the operation mode cannot be changed from the first mode 121 to the third mode 123 at one time.

The first mode is a mode assuming a quiet travel in an urban area. The second mode in which the operation characteristic of the vehicle 3 is superior to the first mode is a mode assuming a sporty travel with a good balance. The third mode in which the operation characteristic of the vehicle 3 is further superior to the second mode is a mode assuming a real super-sporty travel that is further sportier than the second mode. The fourth mode in which the operation characteristic of the vehicle 3 is further superior to the third mode is a mode assuming a race or a time attack in a circuit or the like.

Further, the normal starting (first starting mode) indicates a starting mode which generates a normal gentle quiet starting noise at the time of starting the internal-combustion engine 4. The S/S starting (second starting mode) indicates a starting mode which generates a sporty sound at the time of starting the internal-combustion engine 4, that is, a starting mode which starts the internal-combustion engine by increasing the rotation speed of the internal-combustion engine 4 compared to the normal starting. In the first mode, since a quiet travel in an urban area is assumed, the internal-combustion engine 4 is started by the normal starting at all times. In the second mode, the third mode, and the fourth mode, since the sporty travel is assumed, the internal-combustion engine 4 is started by the S/S starting or the normal starting. In this way, it is determined whether to perform the S/S starting in consideration of the characteristic of each operation mode.

Figure 3:
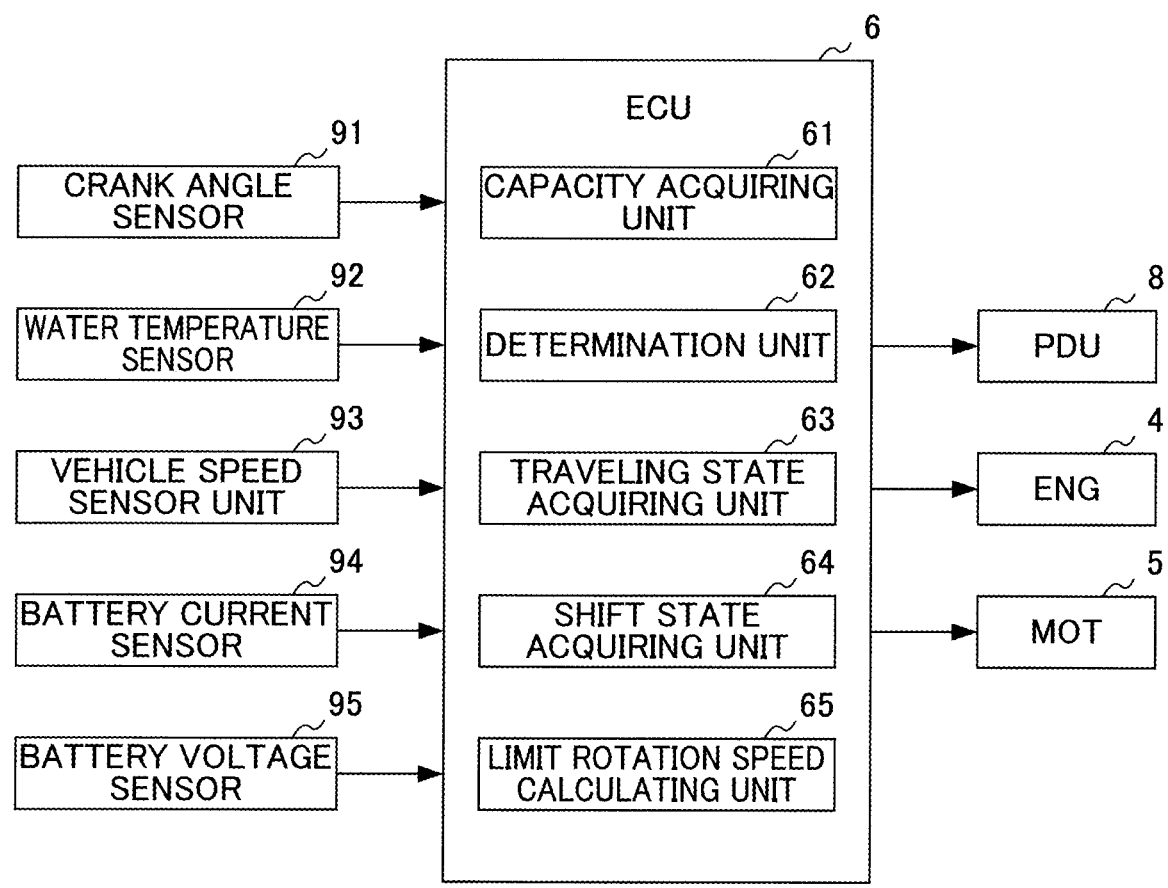
FIG. 3 is a diagram illustrating an ignition switch 110 and a starting mode selection switch 112 of the internal-combustion engine starting device according to the embodiment of the invention.

The ECU 6 with the above-described hardware configuration performs a control of switching the starting mode of the internal-combustion engine 4 of the vehicle 3 by controlling the motor 5 instead of switching the starting mode of the internal-combustion engine 4 of the vehicle 3 by controlling the internal-combustion engine 4. That is, the ECU 6 which controls the motor 5 performs a control of switching the starting mode of the internal-combustion engine 4 of the vehicle 3. Here, FIG. 3 is a functional block diagram illustrating a configuration of the ECU 6 according to the embodiment of the invention. As illustrated in FIG. 3, detection signals of various sensors such as the crank angle sensor 91, the water temperature sensor 92, and the vehicle speed sensor unit 93 are input to the ECU 6 and control signals are output to the PDU 8, the internal-combustion engine (ENG) 4, and the motor 5. Further, the ECU 6 includes a capacity acquiring unit 61, a determination unit 62, a shift state acquiring unit 64, and a limit rotation speed calculating unit 65 as modules for performing a control of switching the starting mode of the internal-combustion engine 4. Hereinafter, functions of modules will be described.

The capacity acquiring unit 61 acquires the usable capacity of the battery 9. That is, the capacity acquiring unit 61 calculates a state of charge (SOC) in which a current remaining amount (kW) is expressed in percentage by assuming the rated capacity of the battery 9 as 1 based on the output of the battery current sensor 94 and the battery voltage sensor 95. Then, the ECU 6 determines whether to perform the EV traveling state or to start the internal-combustion engine 4 based on the SOC calculated by the capacity acquiring unit 61.

The determination unit 62 determines whether the vehicle 3 is currently in the EV traveling state or travels by the internal-combustion engine 4 based on the rotation speed of the internal-combustion engine 4 from the crank angle sensor 91. That is, the determination unit 62 determines that the vehicle 3 currently travels in the EV traveling state when the rotation speed of the internal-combustion engine 4 from the crank angle sensor 91 is 0 (rpm/min). The determination unit 62 determines that the vehicle 3 currently travels by the internal-combustion engine 4 when the rotation speed of the internal-combustion engine 4 from the crank angle sensor 91 is a predetermined value other than 0 (rpm/min).

The shift state acquiring unit 64 is an electric gear selection device which has a plurality of buttons disposed in a center console and switches a parking position, a neutral position, a drive position, and a reverse position by operating the buttons and information output from the electric gear selection device is acquired to determine check a gear shift state among the parking position, the neutral position, the drive position, and the reverse position. The limit rotation speed calculating unit 65 calculates a limit rotation speed BL (see FIG. 4) of the motor 5 based on the electric power output limit value of the battery 9 based on the SOC calculated and output by the capacity acquiring unit 61 and outputs the limit rotation speed.

Figure 4:
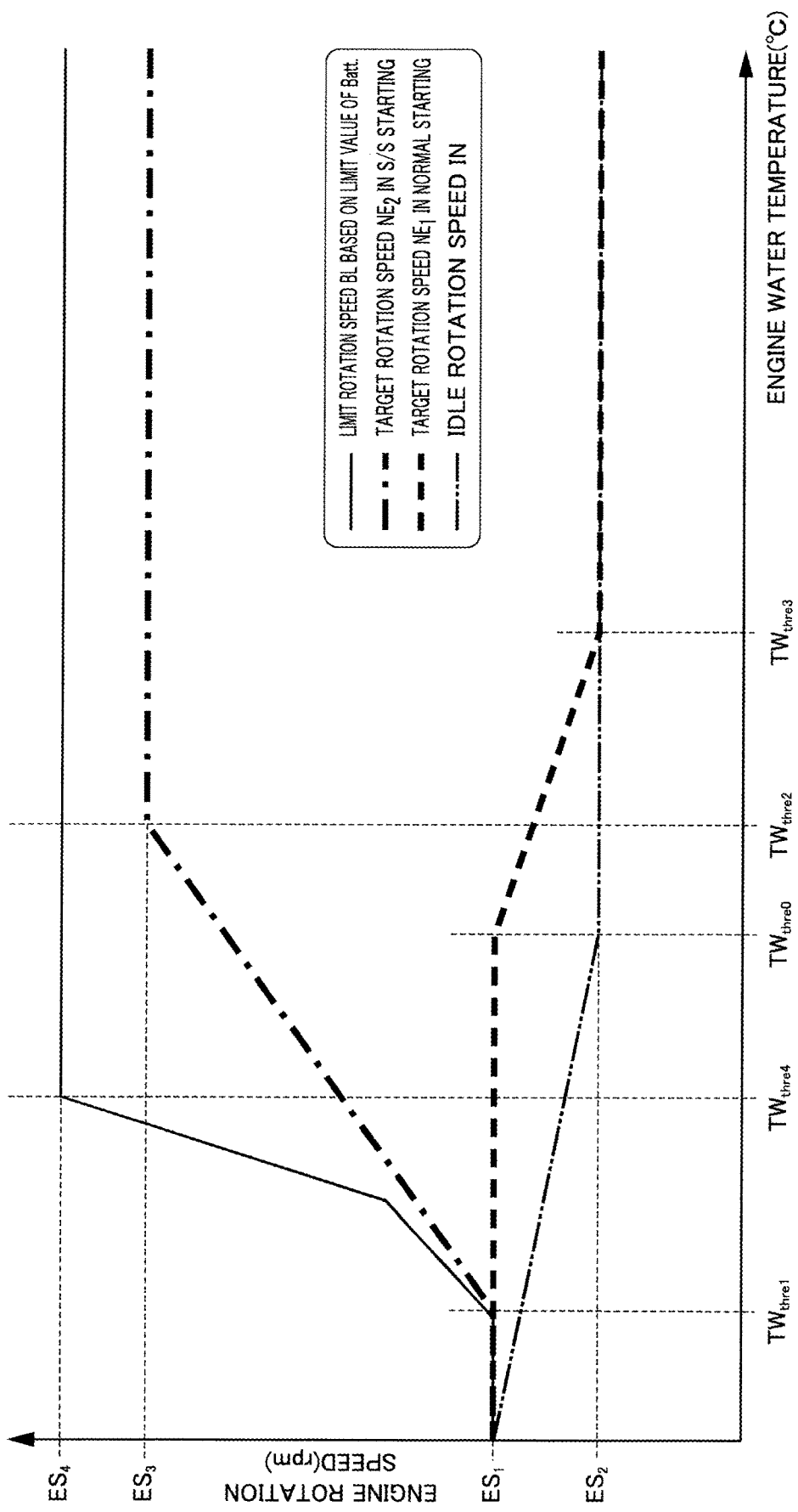
FIG. 4 is a diagram illustrating a relation between a water temperature and a target rotation speed of an internal-combustion engine 4 at the time of starting the internal-combustion engine 4 in the internal-combustion engine starting device according to the embodiment of the invention.
Figure 5:
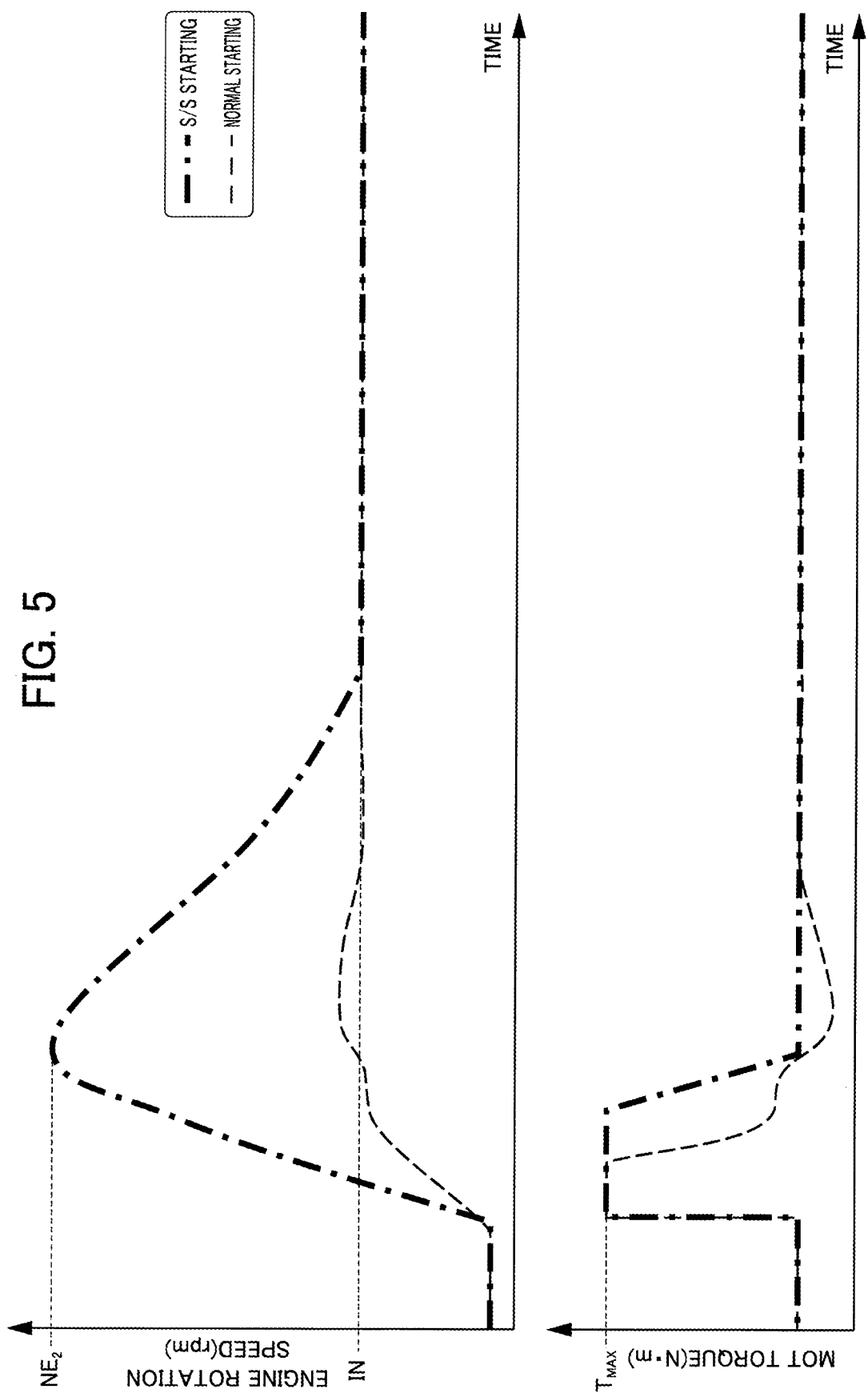
FIG. 5 is a diagram illustrating a relation among an elapse time, a rotation torque of a motor, and a target rotation speed of the internal-combustion engine 4 at the time of starting the internal-combustion engine 4 when a temperature of cooling water exceeds a predetermined temperature $TW_{thre3}$ in the internal-combustion engine starting device according to the embodiment of the invention.

Referring to FIGS. 4 to 11, the "normal starting" and the "S/S starting" of the internal-combustion engine 4 performed by the above-described configuration, the control of the internal-combustion engine 4 using the ECU 6 for starting the internal-combustion engine 4, and the internal-combustion engine starting method performed by the control will be described. The "normal starting (the first starting mode)" and the "S/S starting (the second starting mode)" are selectively realized by the ECU 6. FIG. 4 is a diagram illustrating a relation between a water temperature and a target rotation speed of the internal-combustion engine 4 at the time of starting the internal-combustion engine 4 in the internal-combustion engine starting device according to the embodiment of the invention. FIG. 5 is a diagram illustrating a relation among an elapse time, a rotation torque of the motor, and a target rotation speed of the internal-combustion engine 4 at the time of starting the internal-combustion engine 4 when the temperature of the cooling water exceeds a predetermined temperature $TW_{thre3}$ in the internal-combustion engine starting device according to the embodiment of the invention.

In the "normal starting (the first starting mode)", the ECU 6 controls the motor 5 to start the internal-combustion engine 4 by increasing the rotation speed of the internal-combustion engine 4 to a predetermined first rotation speed NE1 corresponding to a target rotation speed during the normal starting by the motor 5. Specifically, the first rotation speed NE1 is set in advance based on the water temperature acquired by the water temperature sensor 92 and is stored in a storage device (not illustrated) of the ECU 6. The first rotation speed NE1 is a first normal rotation speed ES1 having a constant value when the water temperature is lower than a predetermined temperature $TW_{thre0}$ between $TW_{thre1}$ and $TW_{thre2}$. When the water temperature is equal to or higher than the predetermined temperature $TW_{thre0}$ and is equal to or lower than $TW_{thre3}$, the first rotation speed NE1 decreases so that the rotation speed decreases at a constant decrease rate with respect to an increase in temperature of the cooling water (to draw a linear graph having a negative inclination value). Then, the first rotation speed NE1 is a second normal rotation speed ES2 having a constant value when the water temperature exceeds the predetermined temperature $TW_{thre3}$.

Then, in the normal starting (the first starting mode), the ECU 6 controls the motor 5 to start the internal-combustion engine 4 by increasing the rotation speed of the internal-combustion engine 4 to the first rotation speed NE1 by the motor 5 based on a first control law and to cause the rotation speed of the internal-combustion engine 4 to converge to an idle rotation speed IN equal to or lower than one rotation speed based on the first control law.

Specifically, as illustrated in the graph of the rotation speed of FIG. 5, the ECU 6 performs a feedback control based on a difference between the target rotation speed of the internal-combustion engine 4 and the current rotation speed of the internal-combustion engine 4 in the first control law and controls the motor 5 so that the rotation speed of the internal-combustion engine 4 gradually converges to the idle rotation speed IN. Since the graph of FIG. 5 illustrates a relation among the target rotation speed of the internal-combustion engine 4, the rotation torque of the motor, and the elapse time when the water temperature exceeds the predetermined temperature $TW_{thre3}$, the target rotation speed matches the idle rotation speed IN and the rotation speed gradually converges to the idle rotation speed IN from the starting of the internal-combustion engine 4. The idle rotation speed IN with respect to the value of the water temperature is as illustrated in FIG. 4.

On the contrary, in the "S/S starting (the second starting mode)", the ECU 6 controls the motor 5 to start the internal-combustion engine 4 by increasing the rotation speed of the internal-combustion engine 4 to the second rotation speed NE2 set based on the water temperature and set higher than the first rotation speed NE1 by the motor 5. Specifically, the second rotation speed NE2 is set in advance based on the water temperature acquired by the water temperature sensor 92 and is stored in a storage device (not illustrated) of the ECU 6. The second rotation speed NE2 is set to a value higher than the first rotation speed NE1 by about 1500 rpm/min to 2000 rpm/min in a main cooling water temperature region (for example, a region exceeding the temperature $TW_{thre3}$).

As illustrated in FIG. 4, the second rotation speed NE2 is the first normal rotation speed ES1 having a constant value when the water temperature is lower than $TW_{thre1}$. That is, when the water temperature is lower than $TW_{thre1}$, the second rotation speed NE2 is the same value as the first rotation speed NE1 and the ECU 6 controls the motor 5 to substantially prohibit the second starting mode.

When the water temperature is equal to or higher than the predetermined temperature $TW_{thre1}$ (the first temperature) and equal to or lower than $TW_{thre2}$ (the second temperature), the second rotation speed NE2 increases so that the rotation speed increases at a constant increase rate with respect to an increase in water temperature (to draw a linear graph having a positive inclination value). That is, the ECU 6 increases and sets the second rotation speed NE2 based on the water temperature in a region in which the temperature of the cooling water is equal to or higher than $TW_{thre1}$ (the first temperature) and is equal to or lower than $TW_{thre2}$ (the second temperature) higher than the first temperature. Further, as illustrated in FIG. 4, when the temperature of the cooling water is equal to or higher than the temperature $TW_{thre1}$ (the first temperature) and is equal to or lower than the temperature $TW_{thre4}$ (the fourth temperature), the inclination of the graph of the second rotation speed NE2 increasing with respect to an increase in temperature of the cooling water becomes smaller than the inclination of the limit rotation speed BL. On the contrary, when the temperature of the cooling water is equal to or higher than the temperature $TW_{thre4}$ (the fourth temperature), the inclination of the limit rotation speed BL is constant (the rotation speed ES4) and the inclination of the second rotation speed NE2 is larger than the inclination of the limit rotation speed BL.

Then, when the water temperature exceeds $TW_{thre2}$, the second rotation speed NE2 is a third rotation speed ES3 having a constant value for the S/S starting. That is, the ECU 6 sets the second rotation speed NE2 to a constant value in a region in which the water temperature exceeds $TW_{thre2}$ (the second temperature). In this way, a rotation speed difference between the first rotation speed NE1 and the second rotation speed NE2 is set to a value based on the temperature of the cooling water and the ECU 6 controls the motor 5 to set the rotation speed difference between the first rotation speed NE1 and the second rotation speed NE2 to a value based on the water temperature.

The ECU 6 controls the motor 5 to start the internal-combustion engine 4 by increasing the rotation speed of the internal-combustion engine 4 to the second rotation speed NE2 higher than the first rotation speed NE1 by the motor 5 and to cause the rotation speed of the internal-combustion engine 4 to converge to the idle rotation speed IN equal to or lower than the second rotation speed NE2 based on a second control law different from the first control law.

Specifically, the ECU 6 increases the rotation speed of the internal-combustion engine 4 to the second rotation speed NE2 by the motor 5 according to a feedback control based on a difference between the target rotation speed of the internal-combustion engine 4 and the current rotation speed of the internal-combustion engine 4. In the subsequent second control law, a feedback control based on a difference between the target rotation speed of the internal-combustion, engine 4 and the current rotation speed of the internal-combustion engine 4 like the first control law is not performed. The ECU 6 controls the motor 5 so that a speed at which the current value of the rotation speed of the internal-combustion engine 4 converges to the target value of the rotation speed of the internal-combustion engine 4 in the second control law becomes lower than a speed at which the current value of the rotation speed of the internal-combustion engine 4 converges to the target value of the rotation speed of the internal combustion engine 4 in the control law instead of the feedback control. That is, in the second control law, the ECU 6 controls the motor 5 so that the rotation of the internal-combustion engine 4 gradually decreases at a predetermined decrease rate and converges to the idle rotation speed IN so that the rotation speed converges to the idle rotation speed IN slower than the first control law as illustrated in the graph of the rotation speed of FIG. 5. It is desirable that the predetermined decrease rate gradually increase with time and the decrease rate of the rotation speed of the internal-combustion engine 4 gradually decrease with time as illustrated in the graph of the rotation speed of FIG. 5.

At this time, the ECU 6 controls the motor 5 so that the maximum value $T_{MAX}$ of the torque of the motor 5 of the normal starting (the first starting mode) is substantially the same as the maximum value $T_{MAX}$ of the torque of the motor 5 of the S/S starting (the second starting mode) as illustrated in the graph of the rotation speed of FIG. 5. Further, the ECU 6 controls the motor 5 so that the torque increase speed of the motor 5 of the normal starting (the first starting mode) is substantially the same as the torque increase speed of the motor 5 of the S/S starting (the second starting mode) as illustrated in the graph of the torque (the motor torque) of the motor 5 of FIG. 5. Then, the ECU 6 controls the motor 5 so that a time for taking the maximum value $T_{MAX}$ of the torque of the motor 5 in the S/S starting (the second starting mode) is set to be longer than a time for taking the maximum value $T_{MAX}$ of the torque of the motor 5 in the normal starting (the first starting mode). Subsequently, the ECU 6 gradually and continuously decreases the motor torque until the motor torque becomes 0 so that the motor torque decreases at a predetermined decrease rate with time (to draw a linear graph having a negative inclination value).

Figure 6:
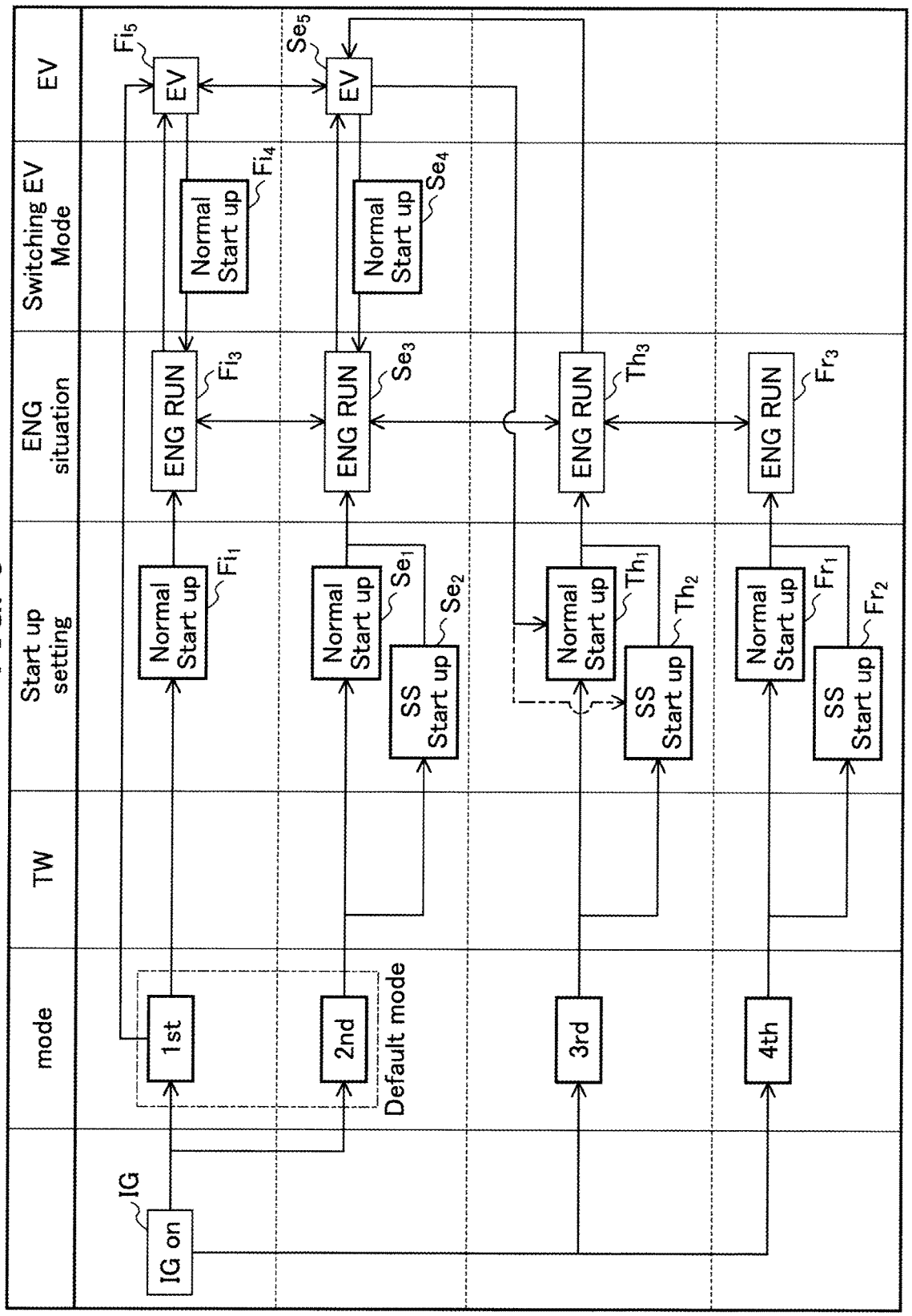
FIG. 6 is a diagram illustrating a switching of a starting mode in the internal-combustion engine starting device according to the embodiment of the invention.

Next, a control which realizes the normal starting (the first starting mode) and the S/S starting (the second starting mode) of the internal-combustion engine 4 by the ECU 6 will be described with reference to FIG. 6. FIG. 6 is a diagram illustrating the switching of the starting mode in the internal-combustion engine starting device according to the embodiment of the invention. As illustrated in FIG. 6, the vehicle 3 is activated by pressing the button switch 111 of the ignition switch 110 (see FIG. 2) (IG). At this time, the starting of the internal-combustion engine 4 or the EV traveling state is switched by the modes having been selected already by the starting mode selection switch 112.

When the button switch 111 of the ignition switch 110 is pressed while the first mode is selected by the starting mode selection switch 112, the ECU 6 controls the motor 5 to prohibit the S/S starting (the second starting mode) and to realize the normal starting (the first starting mode). That is, the ECU 6 controls the motor 5 to realize the normal starting (the first starting mode) (Fi1) when the temperature of the cooling water is equal to or lower than a predetermined temperature $TW_{thre5}$ higher than the first temperature $TW_{thre1}$. The ECU 6 controls the motor 5 to select the EV traveling state without starting the motor 5 (Fi5) when the temperature of the cooling water exceeds the first predetermined temperature $TW_{thre5}$.

If the ECU 6 determines that the accelerator pedal stepping amount, the SOC state, and the temperature of the cooling water satisfy a predetermined condition when the internal-combustion engine 4 is started, the ECU 6 controls the internal-combustion engine 4 to stop the internal-combustion engine 4 and controls the motor 5 to select the EV traveling state (Fi5). Accordingly, the vehicle 3 travels in the EV traveling state. If the ECU 6 determines that the accelerator pedal stepping amount, the SOC state, and the temperature of the cooling water do not satisfy a predetermined condition after the EV traveling state is selected, the ECU 6 controls the motor 5 to start the internal-combustion engine 4 by the normal starting (the first starting mode) (Fi4) and the vehicle 3 travels by the internal-combustion engine 4.

When the button switch 111 or the ignition switch 110 is pressed while the second mode is selected by the starting mode selection switch 112, the ECU 6 controls the motor 5 to selectively realize the normal starting (the first starting mode) or the S/S starting (the second starting mode) based on the temperature of the cooling water. That is, the ECU 6 controls the motor 5 to realize the normal starting (the first starting mode) (Se1) when the temperature of the cooling water is lower than the first temperature $TW_{thre1}$. The ECU 6 controls the motor 5 to realize the starting (the second starting mode) (Se2) when the temperature of the cooling water is equal to or higher than the first temperature $TW_{thre1}$. That is, the ECU 6 sets the second rotation speed NE2 based on the operation characteristic (the operation mode) of the vehicle 3.

If the ECU 6 determines that the accelerator pedal stepping amount, the SOC state, and the temperature of the cooling water satisfy a predetermined condition when the internal-combustion engine 4 is started, the ECU 6 controls the internal-combustion engine 4 to stop the internal-combustion engine 4 and controls the motor 5 to select the EV traveling state (Se5). Accordingly, the vehicle 3 travels in the EV traveling state. If the ECU 6 determines that the accelerator pedal stepping amount, the SOC state, and the temperature of the cooling water do not satisfy a predetermined condition after the EV traveling state is selected, the ECU 6 controls the motor 5 to start the internal-combustion engine 4 by the normal starting (the first starting mode) (Se4) and the vehicle 3 travels by the internal-combustion engine 4.

When the button switch 111 of the ignition switch 110 is pressed while the third mode is selected by the starting mode selection switch 112, that is, the button switch 111 of the ignition switch 110 is pressed so that the vehicle 3 is activated after the third mode is selected by the starting mode selection switch 112, the ECU 6 controls the motor 5 to selectively realize the normal starting (the first starting mode) or the S/S starting (the second starting mode) based on the temperature of the cooling water similarly to the case where the second mode is selected. That is, the ECU 6 controls the motor 5 to realize the normal starting (the first starting mode) (Th1) when the temperature of the cooling water is lower than the first temperature $TW_{thre1}$. The ECU 6 controls the motor 5 to realize the S/S starting (the second starting mode) (Th2) when the temperature of the cooling water is equal to or higher than the first temperature $TW_{thre1}$. When the internal-combustion engine 4 is started, the ECU 6 does not control the motor 5 to select the EV traveling state differently from the first mode or the second mode.

When the button switch 111 of the ignition switch 110 is pressed while the fourth mode is selected by the starting mode selection switch 112, that is, the button switch 111 of the ignition switch 110 is pressed so that the vehicle 3 is activated after the fourth mode is selected by the starting mode selection switch 112, the ECU 6 controls the motor 5 to selectively realize the normal starting (the first starting mode) or the S/S starting (the second starting mode) based on the temperature of the cooling water similarly to the case where the second mode is selected. That is, the ECU 8 controls the motor 5 to realize the normal starting (the first starting mode) (Fr1) when the temperature of the cooling water is lower than the first temperature $TW_{thre1}$. The ECU 6 controls the motor 5 to realize the S/S starting (the second starting mode) (Fr2) when the temperature of the cooling water is equal to or higher than the first temperature $TW_{thre1}$. In a state where the internal-combustion engine 4 is started, the ECU 6 does not control the motor 5 to select the EV traveling state similarly to the third mode.

Next, a control of the ECU 6 is as below when the operation mode is selected by the starting mode selection switch 112 at the time of starting the internal-combustion engine 4 or selecting the EV traveling state. If the starting mode selection switch 112 is switched from the first mode to the second mode or from the second mode to the first mode when the internal-combustion engine 4 is started or the EV traveling state is selected, a state (Fi3, Se3) of starting the internal-combustion engine 4 or a state (Fi5, Se5) of the EV traveling state is continued.

Thus, if the ECU 6 determines that the accelerator pedal stepping amount, the SOC state, and the temperature of the cooling water satisfy a predetermined condition when the internal-combustion engine 4 is started, the ECU 6 controls the internal-combustion engine 4 to stop the internal-combustion engine 4 and controls the motor 5 to select the EV traveling state (Fi5, Se5). Accordingly, the vehicle 3 travels in the EV traveling state. Further, if the ECU 6 determines that the accelerator pedal stepping amount, the SOC state, and the temperature of the cooling water do not satisfy a predetermined condition when the EV traveling state is selected, the ECU 6 controls the motor 5 to start the internal-combustion engine 4 by the normal starting (the first starting mode) (Fi3, Se3) and the vehicle 3 travels by the internal-combustion engine 4.

If the starting mode selection switch 112 is switched from the third mode to the fourth mode or from the fourth mode to the third mode when the internal-combustion engine 4 is started, a state where the internal-combustion engine 4 is started is continued (Fr3, Th3) and the ECU 6 does not control the motor 5 to select the EV traveling state.

When the starting mode selection switch 112 is switched from the third mode to the second mode when the internal-combustion engine 4 is started, a state of starting the internal-combustion engine 4 is continued (Se3). Subsequently, if the ECU 6 determines that the accelerator pedal stepping amount, the SOC state, and the temperature of the cooling water satisfy a predetermined condition, the ECU 6 controls the internal-combustion engine 4 to stop the internal-combustion engine 4 and controls the motor 5 to select the EV traveling state (Se5). Accordingly, the vehicle 3 travels in the EV traveling state. If the ECU 6 determines that the accelerator pedal stepping amount, the SOC state, and the temperature of the cooling water do not satisfy a predetermined condition after the EV traveling state is selected, the ECU 6 controls the motor 5 to start the internal-combustion engine 4 by the normal starting (the first starting mode) (Se4) and the vehicle 3 travels by the internal-combustion engine 4.

If the starting mode selection switch 112 is switched from the second mode to the third mode when the EV traveling state is selected, the EV traveling state is not performed in the third mode and thus the internal-combustion engine 4 is started. At this time, the ECU 6 controls the motor 5 to prohibit the starting of the internal-combustion engine 4 by the S/S starting (the second starting mode) and to realize the starting of the internal-combustion engine 4 by the normal starting (the first starting mode) in principle (Th1).

In this way, if the starting mode selection switch 112 is switched from the second mode to the third mode when the EV traveling state is selected in the second mode, the ECU 6 controls the motor 5 to start the internal-combustion engine 4 by the normal starting (the first starting mode) in principle at the time of starting the internal-combustion engine 4. However, the ECU controls the motor 5 to start the internal-combustion engine 4 by the S/S starting (the second starting mode) at the time of starting the internal-combustion engine 4 in a specific EV traveling state of the EV traveling state. Similarly, the ECU 6 controls the motor 5 to start the internal-combustion engine 4 by the normal starting (the first starting mode) in principle when the EV traveling state is selected in the first mode at the time of starting the internal-combustion engine 4 after the starting mode selection switch 112 is switched from the first mode to the second mode. However, the ECU controls the motor 5 to start the internal-combustion engine 4 by the S/S starting (the second starting mode) at the time of starting the internal-combustion engine 4 in a specific EV traveling state of the EV traveling state. Here, the "specific EV traveling state" means a case where the vehicle 3 travels in the "EV sailing state", the vehicle 3 is in the "EV stop state" in which the EV traveling state is stopped, or the vehicle 3 travels in the "EV low-speed state".

That is, there are various EV traveling conditions. When an original EV traveling condition is set for each of the traveling states (the specific EV traveling states) of the vehicle 3 and the original EV traveling condition is satisfied, the ECU 6 controls the motor 5 to start the internal-combustion engine 4 by the S/S starting (the second starting mode).

Figure 7:
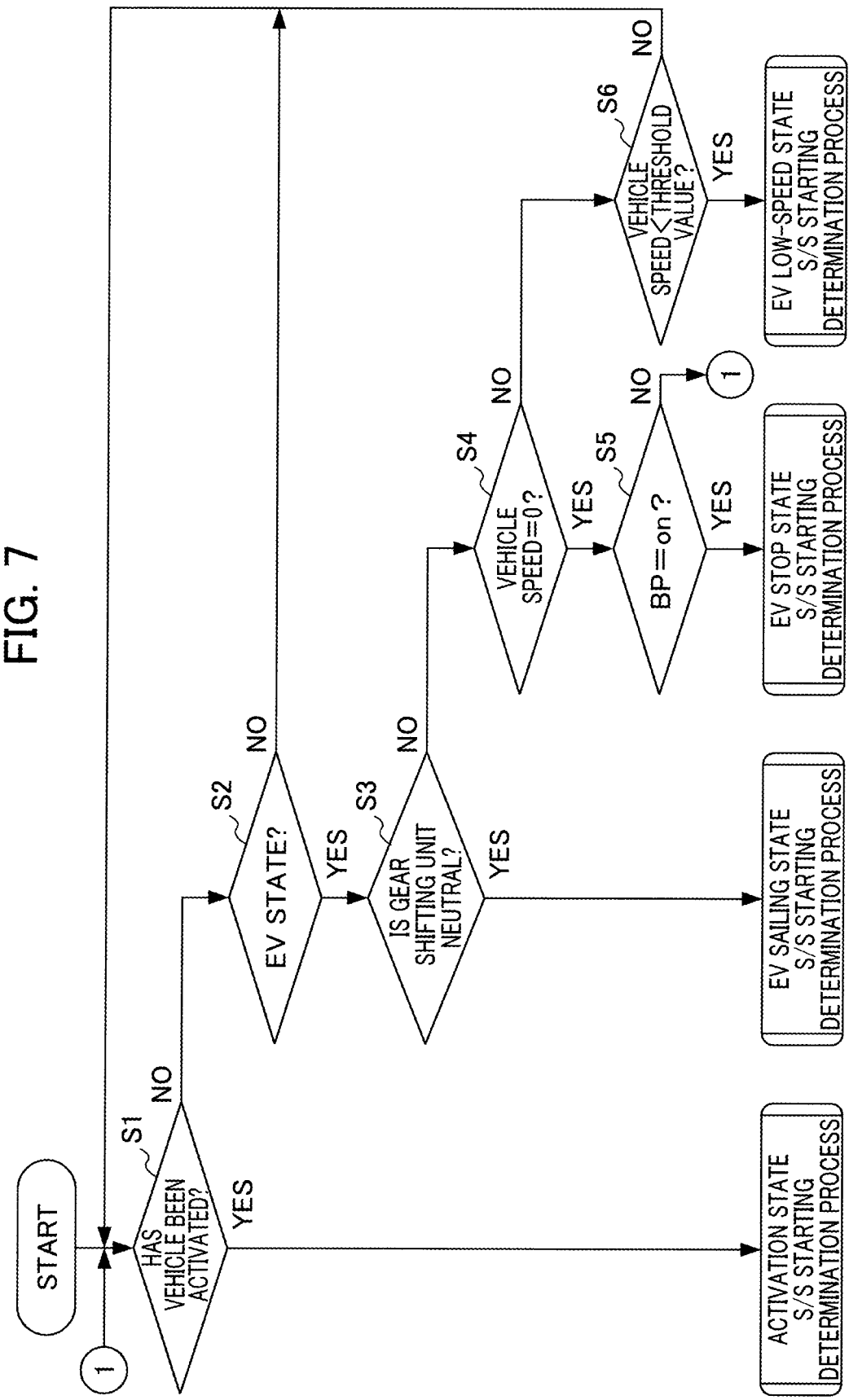
FIG. 7 is a flowchart illustrating an S/S starting determination process in the internal-combustion engine starting device according to the embodiment of the invention.
Figure 8:
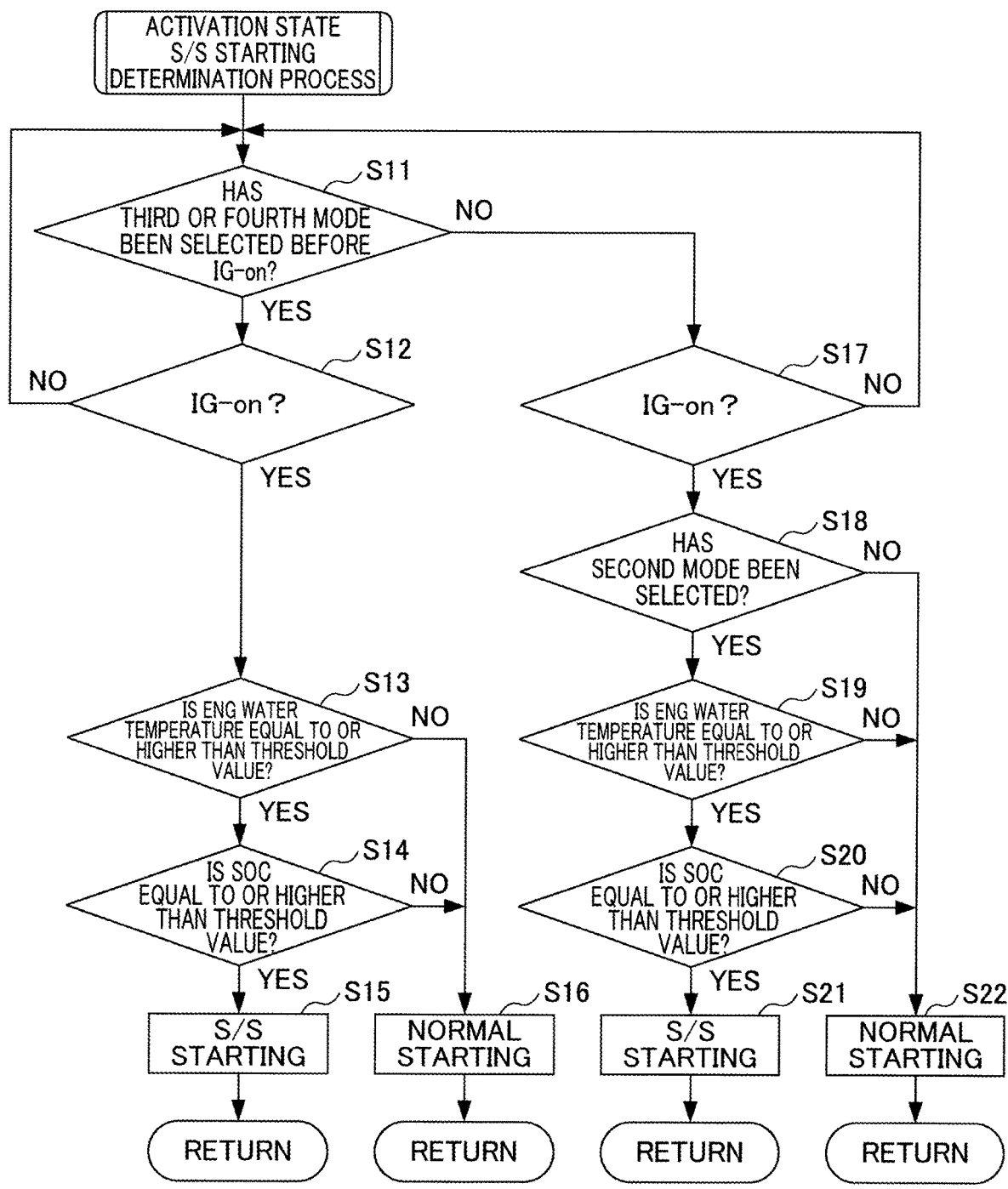
FIG. 8 is a flowchart illustrating an S/S starting determination process at the time of activating a vehicle in the internal-combustion engine starting device according to the embodiment of the invention.
Figure 9:
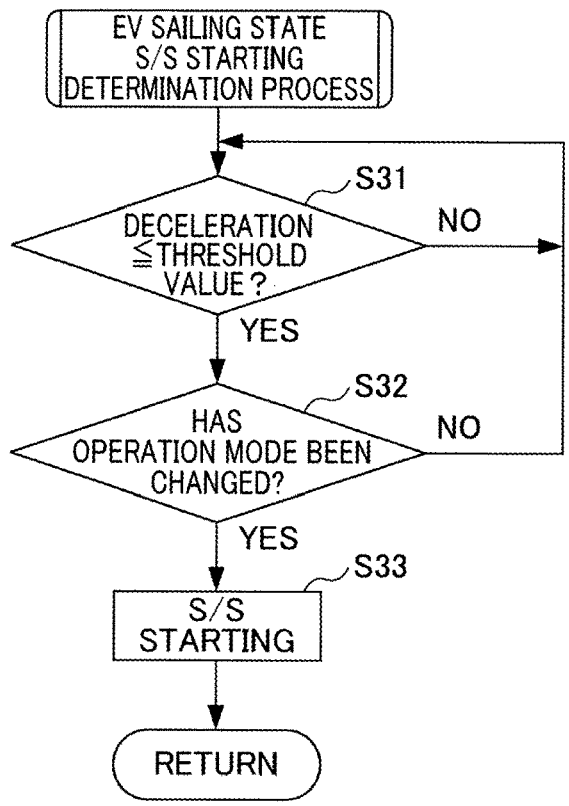
FIG. 9 is a flowchart illustrating a starting determination process in an EV sailing state of the internal-combustion engine starting device according to the embodiment of the invention.
Figure 10:
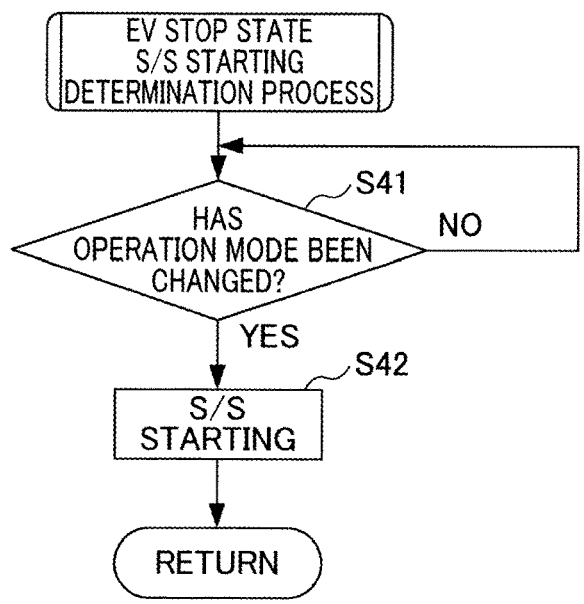
FIG. 10 is a flowchart illustrating an S/S starting determination process in an EV stop state in the internal-combustion engine starting device according to the embodiment of the invention.
Figure 11:
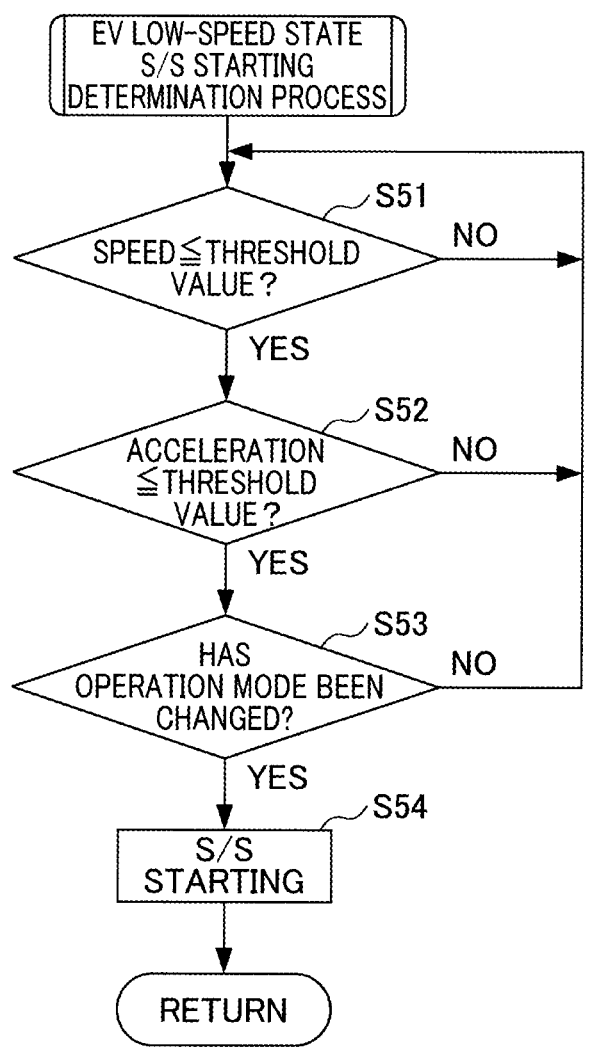
FIG. 11 is a flowchart illustrating an S/S starting determination process in an EV low-speed state in the internal-combustion engine starting device according to the embodiment of the invention.

Hereinafter, a control of starting the internal-combustion engine 4 using the ECU 6 will be described along with the starting of the internal-combustion engine 4 in such a specific EV traveling state will be described with reference to the flowcharts of FIGS. 7 to 11. FIG. 7 is a flowchart illustrating an S/S starting determination process of the internal-combustion engine starting device according to the embodiment of the invention. FIG. 8 is a flowchart illustrating an S/S starting determination process at the time of activating the vehicle in the internal-combustion engine starting device according to the embodiment of the invention. FIG. 9 is a flowchart illustrating a starting determination process in the EV sailing state in the internal-combustion engine starting device according to the embodiment of the invention. FIG. 10 is a flowchart illustrating an S/S starting determination process in the EV stop state in the internal-combustion engine starting device according to the embodiment of the invention. FIG. 11 is a flowchart illustrating an S/S starting determination process in the EV low-speed state in the internal-combustion engine starting device according to the embodiment of the invention.

The processes of the ECU 6 indicated by the flowcharts of FIGS. 7 to 11 are started in a state before the button switch 111 of the ignition switch 110 is pressed, that is, the vehicle 3 is activated. First, in step S1, the ECU 6 determines whether it is a state before the vehicle 3 is activated, that is, the button switch 111 of the ignition switch 110 is pressed. When this determination is YES, the process using the ECU 6 proceeds to the activation state S/S starting determination process (see FIG. 8). When this determination is NO, the process using the ECU 6 proceeds to step S2.

In step S2, the ECU 6 determines whether the vehicle 3 is in the EV traveling state based on the rotation speed of the internal-combustion engine 4 acquired by the crank angle sensor 91 serving as the rotation speed acquiring unit. When this determination is YES, the process using the ECU 6 proceeds to step S3. When this determination is NO, the process using the ECU 6 returns to step S1.

In step S3, the ECU 6 determines whether the transmission 7 is in the neutral state based on the information output from the electric gear selection device. When this determination is YES, the process using the ECU 6 proceeds to the EV sailing state S/S starting determination process (see FIG. 9). When this determination is NO, the process using the ECU 6 proceeds to step S4.

In step S4, the ECU 6 determines whether the vehicle speed of the vehicle 3 is 0 (km/h) based on the information of the vehicle speed of the vehicle 3 acquired by the vehicle speed sensor unit 93. When this determination is YES, the process using the ECU 6 proceeds no step S5. When this determination is NO (the vehicle speed of the vehicle 3 is higher than 0 (km/h)), the process using the ECU 6 proceeds to step S6.

In step S5, the ECU 6 determines whether the brake pedal is stepped based, on the brake pedal stepping amount, when this determination is YES, the process using the ECU 6 proceeds to the EV stop state S/S starting determination process (see FIG. 10). When this determination is NO, the process using the ECU 6 returns to step S1.

In step S6, the ECU 6 determines whether the vehicle speed of the vehicle 3 is equal to or lower than a predetermined threshold value (a speed threshold value) based on the information of the vehicle speed of the vehicle 3 acquired by the vehicle speed sensor unit 93. When this determination is YES, the process using the ECU 6 proceeds to the EV low-speed state S/S starting determination process (see FIG. 11). When this determination is NO, the process using the ECU 6 returns to step S1.

In the activation state S/S starting determination process (see FIG. 8), first in step S11, the ECU 6 determines whether the third mode or the fourth mode 124 is selected as the operation mode in a state before the button switch 111 of the ignition switch 110 is pressed, that is, the vehicle 3 is activated based on the operation mode acquired from the ignition switch 110. When this determination is YES, the process using the ECU 6 proceeds to step S12. When this determination is NO, the process using the ECU 6 proceeds to step S17.

In step S12, the ECU 6 determines whether the button switch 111 of the ignition switch 110 is pressed. When this determination is YES, the process using the ECU 6 proceeds to step S13. When this determination is NO, the process using the ECU 6 returns to step S11.

In step S13, the ECU 6 determines whether the temperature of the cooling water is equal to or higher than the first temperature $TW_{thre1}$ corresponding to the threshold value based on the temperature of the cooling water serving as the coolant acquired from the water temperature sensor 92 serving as the temperature acquiring unit. When this determination is YES, the process using the ECU 6 proceeds to step S14. When this determination is NO, the process using the ECU 6 proceeds to step S16.

In step S14, the ECU 6 determines whether the SOC calculated by the capacity acquiring unit 61 is equal to or larger than a predetermined threshold value. When this determination is YES, the process using the ECU 6 proceeds to step S15. When this determination is NO, the process using the ECU 6 proceeds to step S16.

In step S15, the ECU 6 controls the motor 5 to realize the S/S starting (the second starting mode). Accordingly, the internal-combustion engine 4 is started by the S/S starting (the second starting mode). Then, the present process according to the control of the ECU 6 ends. Further, in step S16, the ECU 6 controls the motor 5 to realize the normal starting (the first starting mode). Accordingly, the internal-combustion engine 4 is started by the normal starting (the first starting mode). Then, the present process according to the control of the ECU 6 ends.

In step S17, the ECU 6 determines whether the button switch 111 of the ignition switch 110 is pressed. When this determination is YES, the process using the ECU 6 proceeds to step S18. When this determination is NO, the process using the ECU 6 returns to step S11.

In step S18, the ECU 6 determines whether the second mode is selected by the starting mode selection switch 112 based on the operation mode acquired from the ignition switch 110. When this determination is YES, the process using the ECU 6 proceeds to step S19. When this determination is NO, the process using the ECU 6 proceeds to step S22.

In step S19, the ECU 6 determines whether the temperature of the cooling water is equal to or higher than the first temperature $TW_{thre1}$ corresponding to a predetermined threshold value based on the temperature of the cooling water serving as the coolant acquired from the water temperature sensor 92 serving as the temperature acquiring unit. When this determination is YES, the process using the ECU 6 proceeds to step S20. When this determination is NO, the process using the ECU 6 proceeds to step S22.

In step S20, the ECU 6 determines whether the SOC calculated by the capacity acquiring unit 61 is equal to or larger than a predetermined threshold value. When this determination is YES, the process using the ECU 6 proceeds to step S21. When this determination is NO, the process using the ECU 6 proceeds to step S22.

In step S21, the ECU 6 controls the motor 5 to realize the S/S starting (the second starting mode). Accordingly, the internal-combustion engine 4 is started by the S/S starting (the second starting mode). Then, the present process according to the control of the ECU 6 ends. Further, in step S22, the ECU 5 controls the motor 5 to realize the normal starting (the first starting mode). Accordingly, the internal-combustion engine 4 is started by the normal starting (the first starting mode). Then, the present process according to the control of the ECU 6 ends.

In the EV sailing state S/S starting determination process (see FIG. 9), first, in step S31, the ECU 6 determines whether the deceleration of the vehicle 3 is equal to or lower than a predetermined threshold value (a deceleration threshold value) based on the actual acceleration of the vehicle 3 acquired by the vehicle speed sensor unit 93. When this determination is YES, the process using the ECU 6 proceeds to step S32. When this determination is NO, the process using the ECU 6 returns to step S31.

In step S32, the ECU 6 determines whether the operation mode is switched from the first mode to the second mode or from the second mode to the third mode by the starting mode selection switch 112 based on the operation mode acquired from the ignition switch 110. When this determination is YES, the process using the ECU 6 proceeds to step S33. When this determination is NO, the process using the ECU 6 returns to step S31.

In step S33, the ECU 6 controls the motor 5 to realize the S/S starting (the second starting mode). Accordingly, the internal-combustion engine 4 is started by the S/S starting (the second starting mode). Then, the present process according to the control of the ECU 6 ends.

In the EV stop state S/S starting determination process (see FIG. 10), first, in step S41, the ECU 6 determines whether the operation mode is switched from the first mode to the second mode or from the second mode to the third mode by the starting mode selection switch 112 based on the operation mode acquired from the ignition switch 110. When this determination is YES, the process using the ECU 6 proceeds to step S42. When this determination is NO, the process using the ECU 6 returns to step S41.

In step S42, the ECU 6 controls the motor 5 to realize the S/S starting (the second starting mode). Accordingly, the internal-combustion engine 4 is started by the S/S starting (the second starting mode). Then, the present process according to the control of the ECU 6 ends.

In the EV low-speed state S/S starting determination process (see FIG. 11), first, in step S51, the ECU 6 determines whether the vehicle speed of the vehicle 3 is equal to or lower than a predetermined threshold value (a speed threshold value) based on the information of the vehicle speed of the vehicle 3 acquired by the vehicle speed sensor unit 93. When this determination is YES, the process using the ECU 6 proceeds to step S52. When this determination is NO, the process using the ECU 6 returns to step S51.

In step S52, the ECU 6 determines whether the acceleration of the vehicle 3 is equal to or lower than a predetermined threshold value (an acceleration threshold value) based on the information of the acceleration of the vehicle 3 acquired fey the vehicle speed sensor unit 93. When this determination is YES, the process using the ECU 6 proceeds to step S53. When this determination is NO, the process using the ECU 6 returns to step S51.

In step S53, the ECU 6 determines whether the operation mode is switched from the first mode to the second mode or from the second mode to the third mode by the starting mode selection switch 112 based on the operation mode acquired from the ignition switch 110. When this determination is YES, the process using the ECU 6 proceeds to step S54. When this determination is NO, the process using the ECU 6 returns to step S51.

In step S54, the ECU 6 controls the motor 5 to realize the S/S starting (the second starting mode). Accordingly, the internal-combustion engine 4 is started by the S/S starting (the second starting mode). Then, the present process according to the control of the ECU 6 ends.

As described above, the ECU 6 serving as the determination unit 62 determines whether to allow the S/S starting (the second starting mode) based on a predetermined vehicle starting condition such as the operation mode at the time of activating the vehicle 3 and determines whether to allow the second starting mode based on the EV traveling condition (illustrating whether a specific EV mode is selected) different from the vehicle starting condition while the driving power is supplied only from the motor 5 to the vehicle wheel Wr. Then, the vehicle starting condition (a condition for performing the normal starting (one starting mode)) includes the usable capacity of the battery corresponding to SOC as one of the conditions. On the contrary, since a determination on whether the SOC satisfies a predetermined condition in the EV traveling state, the EV traveling condition (the condition for determining whether to allow the S/S starting (the second starting mode) in the EV traveling state) does not include the usable capacity of the battery corresponding to the SOC as one of the conditions.

According to the embodiment, the following effect is obtained. The ECU 6 constituting the internal-combustion engine starting device controls the motor 5 to realize the first starting mode of starting the internal-combustion engine 4 by increasing the rotation speed of the internal-combustion engine 4 to the predetermined first rotation speed NE1 by the motor 5 and the second starting mode of starting the internal-combustion engine 4 by increasing the rotation speed of the internal-combustion engine 4 to the second rotation speed NE2 set higher than the first rotation speed NE1 and set based on the water temperature by the motor 5.

Accordingly, it is possible to easily realize the higher second rotation speed NE2 in the second starting mode. Further, since the sound generated at the time of starting the internal-combustion engine 4 can be made sporty by further increasing a difference between the first rotation speed NE1 and the second rotation speed NE2, the acoustic effect can be improved. When the second rotation speed NE2 is set without considering the temperature of the cooling water corresponding to the coolant, a low rotation speed difference is set to about 200 rpm to 500 rpm as disclosed in Patent Document 1 or a high rotation speed difference is set to cause a control failure. However, since the second rotation, speed NE2 of the second starting mode of starting the internal-combustion engine is set based on the temperature of the coolant as described above, a high rotation speed difference of 1,500 to 2,000 rpm to maximum can be realized without setting the rotation speed difference between the first rotation speed NE1 and the second rotation speed NE2 to a low value and causing the control failure. As a result, since the driver can imagine the sporty driving of the vehicle 3 to be driven from the sound generated at the time of starting the internal-combustion engine 4 before the driving, the driver can expect fun driving.

Further, the ECU 6 controls the motor 5 to set the rotation speed difference between the first rotation speed NE1 and the second rotation speed NE2 to a value based on the water temperature. Accordingly, it is possible to easily set the rotation speed difference between the first rotation speed NE1 and the second rotation speed NE2 to be large with certainty. When the rotation speed difference between the first rotation speed NE1 and the second rotation speed NE2 is set without considering the temperature of the cooling water corresponding to the coolant, a low rotation speed difference is set to about 200 rpm to 500 rpm as disclosed in Patent Document 1 or a high rotation speed difference is set to cause a control failure. However, since the rotation speed difference between the first rotation speed NE1 and the second rotation speed NE2 is set based on the temperature of the coolant as described above, a high rotation speed difference of 1,500 to 2,000 rpm to maximum can be realized without setting the rotation speed difference to a low value or causing the control failure.

Further, the ECU 6 increases and sets the second rotation speed NE2 based on the water temperature in a region in which the water temperature is equal to or higher than the predetermined first temperature $TW_{thre1}$ and is equal to or lower than the second temperature $TW_{thre2}$ higher than the first temperature. Accordingly, since it is possible to easily realize the higher second rotation speed NE2 in the second starting mode, it is possible to further improve the acoustic effect at the time of starting the internal-combustion engine 4. When the temperature of the cooling water corresponding to the coolant is not considered, a low rotation speed difference is set to about 200 rpm to 500 rpm as disclosed in Patent Document 1 or a high rotation speed difference is set to cause a control failure. However, since the second rotation speed of the second starting mode is set to increase as the temperature of the coolant increases based on the temperature of the coolant as described above, a high rotation speed difference of 1,500 to 2,000 rpm to maximum can be realized without setting the rotation speed difference between the first rotation speed NE1 and the second rotation speed NE2 to a low value and causing the control failure.

Further, the ECU 6 sets the second rotation speed NE2 to a constant value in a region in which the water temperature exceeds the second temperature $TW_{thre2}$. Accordingly, since it is possible to set the high rotation speed which is constant at all times as the second rotation speed NE2 of the second starting mode in a region in which the water temperature exceeds the second temperature $TW_{thre2}$, it is possible to exhibit the uniform acoustic effect at the time of starting the internal-combustion engine 4. For this reason, it is possible to stably give a sporty feeling to the driver at all times without discomfort whenever starting the internal-combustion engine 4.

Further, the ECU 6 sets the second rotation speed NE2 to be equal to or higher than a predetermined lower-limit rotation speed and equal to or lower than a predetermined upper-limit rotation speed in a region in which the water temperature exceeds the second temperature $TW_{thre2}$. Accordingly, since it is possible to set the high rotation speed which is constant at all times as the second rotation speed NE2 in the second starting mode in a region in which the water temperature exceeds the second temperature $TW_{thre2}$, it is possible to exhibit the same acoustic effect at the time of starting the internal-combustion engine 4. For this reason, it is possible to stably give a sporty feeling to the driver at all times without discomfort whenever starting the internal-combustion engine 4.

Further, the ECU 6 controls the motor 5 to prohibit the realization of the second starting mode in a region in which the water temperature is lower than the first temperature $TW_{thre1}$. Accordingly, it is possible to prohibit the internal-combustion engine 4 from starting with a high rotation despite the low temperature of the coolant and to protect the internal-combustion engine 4.

Further, the storage battery unit which includes the battery 9 serving as the storage battery outputting electric power to the motor 5 and the limit rotation speed calculating unit 65 calculating the limit rotation speed BL of the motor based on the electric power output limit value of the battery 9 is further provided and the ECU 6 serving as the control unit controls the motor 5 so that an increase degree of the second rotation speed NE2 becomes smaller than an increase degree of the limit rotation speed BL in a region in which the water temperature is equal to or higher than the first temperature $TW_{thre1}$ and is equal to or lower than the second temperature $TW_{thre2}$.

For this reason, since it is possible to prevent the setting of the second, rotation speed NE2 exceeding the target rotation speed (the limit rotation speed BL) determined from the electric power output limit value of the battery 9 serving as the storage battery, it is possible to set the second rotation speed NE2 in the stable second starting mode.

Further, the internal-combustion engine 4 further includes the starting mode selection switch 112 serving as the selection unit supplying driving power to the vehicle wheel Wr of the vehicle 3 and changing the operation characteristic of the vehicle 3 and the ECU 6 serving as the control unit sets the second rotation speed NE2 based on the operation characteristic of the vehicle 3. For this reason, it is possible to make the acoustic effect in response to the operation characteristic of the vehicle 3 selected by the starting mode selection switch 112. Further, since the mode selected by the selection unit is synchronized with the acoustic effect generated at the time of starting the internal-combustion engine 4, it is possible to improve the satisfaction of the driver with respect to the request (the sporty vehicle behavior) of the driver.

Further, the ECU 6 serving as the control unit controls the motor 5 to prohibit the realization of the second starting mode when a difference between the second rotation speed NE2 and the first rotation speed NE1 set based on the water temperature is a predetermined value or less. For this reason, it is possible to prevent the acoustic effect of the starting sound of the internal-combustion engine 4 which is not sporty and does not satisfy the driver of the vehicle 3. Thus, it is possible to prevent a case where the satisfaction of the owner of the vehicle 3 with respect to the vehicle 3 is impaired. That is, it is possible to prevent a case where the pride of the owner of the vehicle 3 is impaired by owning a sporty luxury car.

Further, the ECU 6 serving as the control unit controls the motor 5 to perform the first starting mode of increasing the rotation speed of the internal-combustion engine 4 to the first rotation speed NE1 based on the first control law by the motor 5 to start the internal-combustion engine 4 and causes the rotation speed of the internal-combustion engine 4 to converge to the idle rotation speed IN equal to or lower than one rotation speed based on the first control law and the second starting mode of increasing the rotation speed or the internal-combustion engine 4 to the second rotation speed NE2 higher than the first rotation speed NE1 by the motor 5 to start the internal-combustion engine 4 and causes the rotation speed of the internal-combustion engine 4 to converge to the idle rotation speed IN equal to or lower than the second rotation speed NE2 based on the second control law different from the first control law.

For this reason, in the second starting mode, the control law is changed after the rotation speed of the internal-combustion engine 4 reaches the second rotation speed NE2 higher than the first rotation speed NE1 and the rotation speed of the internal-combustion engine 4 converges to the idle rotation speed IN equal to or lower than the second rotation speed NE2 by the second control law. Accordingly, it is possible to have a variation in acoustic effect with time at the time of starting the internal-combustion engine 4 by a difference between the acoustic characteristic before the engine rotation speed reaches the second rotation speed NE2 corresponding to the target rotation speed and the acoustic characteristic after the engine rotation speed reaches the second rotation speed NE2 corresponding to the target rotation speed.

Further, the ECU 6 serving as the control unit controls the motor 5 so that a speed at which the current value of the rotation speed of the internal-combustion engine 4 converges to the idle rotation speed IN corresponding to the target value of the rotation speed of the internal-combustion engine 4 in the first control law becomes larger than a speed at which the current value of the rotation speed of the internal-combustion engine 4 converges to the idle rotation speed IN corresponding to the target value of the rotation speed of the internal-combustion engine 4 in the second control law.

For this reason, a change rate of the speed at which the current value of the rotation speed of the internal-combustion engine 4 converges to the target value of the rotation speed of the internal-combustion engine 4 in the second control law is smaller than a change rate of the speed at which the current value of the rotation speed of the internal-combustion engine 4 converges to the target value of the rotation speed of the internal-combustion engine 4 in the first control law. Accordingly, a sharp sound is generated by rapidly increasing the rotation speed of the internal-combustion engine 4 to the second rotation speed NE2 corresponding to the high rotation range at the time of starting the internal-combustion engine 4. Then, a reverberation recalled from a reverberation sound caused by the slow convergence of the rotation speed of the internal-combustion engine 4 to the target value of the rotation speed of the internal-combustion engine 4 can be generated after the rotation speed of the internal-combustion engine 4 reaches the second rotation speed NE2.

Further, the ECU 6 serving as the control unit controls the motor 5 so that the rotation speed of the internal-combustion engine 4 in the second control law decreases at a predetermined decrease rate and converges to the idle rotation speed IN.

For this reason, the rotation speed of the internal-combustion engine 4 decreases at a predetermined decrease rate and converges to the idle rotation speed IN after the rotation speed of the internal-combustion engine 4 reaches the second rotation speed NE2 in the second starting mode. Accordingly, it is possible to generate a reverberation recalled from a reverberation sound caused by the slow convergence of the rotation speed of the internal-combustion engine 4 to the idle rotation speed IN after the rotation speed of the internal-combustion engine 4 reaches the second rotation speed NE2.

Further, the ECU 6 serving as the control unit controls the motor 5 so that the rotation speed of the internal-combustion engine 4 in the second control law decreases at a predetermined decrease rate, which gradually increases, and converges to the idle rotation speed IN.

For this reason, the rotation speed of the internal-combustion engine 4 converges to the idle rotation speed IN while increasing the gradual decrease degree after the rotation speed of the internal-combustion engine 4 reaches the second rotation speed NE2 in the second starting mode. Accordingly, since it is possible to prolong the reverberation sound of the low frequency range of the reverberation generated by the convergence of the rotation speed of the internal-combustion engine 4 to the idle rotation speed IN after the rotation speed of the internal-combustion engine 4 reaches the second rotation speed NE2, it is possible to more effectively exhibit the reverberation.

Further, the ECU 6 serving as the control unit controls the motor 5 so that a feedback control is performed based on a difference between the target rotation speed of the internal-combustion engine 4 and the current rotation speed of the internal-combustion engine 4 in the first control law.

For this reason, since the control unit performs a control based on the first control law before the rotation speed of the internal-combustion engine 4 reaches the second rotation speed NE2 in the second starting mode, the feedback control is performed based on a difference between the target rotation speed and the current rotation speed of the internal-combustion engine 4. Accordingly, the rotation speed of the internal-combustion engine 4 can stably reach the second rotation speed NE2 corresponding to the target rotation speed without causing a large overshoot with respect to the target rotation speed.

Further, the ECU 6 serving as the control unit controls the motor 5 so that a torque increase speed of the motor 5 in the first starting mode becomes substantially the same as a torque increase speed of the motor 5 in the second starting mode.

For this reason, the torque increase speed of the motor 5 in the first starting mode becomes substantially the same as the torque increase speed of the motor 5 in the second starting mode. Accordingly, since it is possible to emphasize a difference in high tone in the high rotation range of the internal-combustion engine 4 between the first starting mode and the second starting mode with respect to a case where the first starting mode and the second starting mode have the same low tone in the low rotation range of the internal-combustion engine 4 at the time of starting the internal-combustion engine 4, it is possible to further improve the acoustic effect.

Further, the ECU 6 serving as the control unit controls the motor 5 so that a maximum value of the torque of the motor 5 in the first starting mode becomes substantially the same as a maximum value of the torque of the motor 5 in the second starting mode.

For this reason, the maximum value of the torque of the motor 5 in the first starting mode becomes substantially the same as the maximum value of the torque of the motor 5 in the second starting mode. Accordingly, it is possible to exhibit the acoustic effect in which the high tone in the high rotation range of the internal-combustion engine 4 is generated by rotating the motor 5 to the limit.

Further, the ECU 6 serving as the control unit can control the motor 5 to realize the first starting mode of starting the internal-combustion engine 4 by increasing the rotation speed of the internal-combustion engine 4 to the predetermined first rotation speed NE1 by the motor 5 and the second starting mode of starting the internal-combustion engine 4 by increasing the rotation speed of the internal-combustion engine 4 to the second rotation speed NE2 higher than the first rotation speed NE1 by the motor 5 and the ECU 6 controls the motor 5 to prohibit the second starting mode when the first mode 121 is selected by the starting mode selection switch 112 serving as the selection unit.

For this reason, the second starting mode is prohibited when the first mode 121 is selected. Accordingly, when the driver of the vehicle 3 expects the silent driving, the second starting mode can be prohibited.

Further, the ignition switch 110 serving as the starting unit for regaining the activation of the internal-combustion engine 4 is further provided, the plurality of operation modes further include the third mode 123 in which the operation characteristic of the vehicle 3 is more excellent than the second mode 122, and the ECU 6 serving as the control unit controls the motor 5 to realize the second starting mode when the activation of the vehicle 3 is required by the ignition switch 110 after the third mode 123 is selected by the starting mode selection switch 112.

For this reason, the second starting mode is realized when the activation of the vehicle 3 is required by the ignition switch 110 after the third mode 123 is selected by the starting mode selection switch 112. Accordingly, it is possible to start the internal-combustion engine 4 by the second starting mode based on the clear intension of the driver in the mode in which the operation characteristic is excellent and which is equal to or higher than the third mode 123.

Further, the starting mode selection switch 112 serving as the selection unit allows the switching of the operation mode only to the operation mode in which the operation characteristic of the vehicle 3 is superior to that of the selected operation mode and the operation mode in which the operation characteristic of the vehicle 3 is inferior to that of the selected operation mode.

For this reason, the operation mode can be switched to the adjacent operation mode by the starting mode selection switch 112. Accordingly, it is possible to prevent an abrupt switching of the operation mode, that is, an abrupt change in operation characteristic.

Further, the ECU 6 serving as the control unit controls the motor 5 to prohibit the second starting mode in principle when the operation mode is changed from the second mode 122 to the third mode 123 by the starting mode selection switch 112 serving as the selection unit.

For this reason, the second starting mode is prohibited when the operation mode is changed to the third mode 123 by the selection unit in the EV traveling state of the second mode 122. Accordingly, hesitation in the internal-combustion engine 4 can be suppressed. Here, the hesitation means a state where the driving power is not temporarily generated. More specifically, the hesitation means the response delay of the vehicle at the time of stepping on the accelerator pedal, that is, at the time of operating the throttle valve. Generally, the hesitation means a temporary decrease in engine output occurring in a short time in the state or after stepping on the accelerator.

Further, the ECU 6 serving as the control unit can control the motor 5 to selectively realize the first starting mode of starting the internal-combustion engine 4 by increasing the rotation speed of the internal-combustion engine 4 to the predetermined first rotation speed NE1 by the motor 5 and the second starting mode of starting the internal-combustion engine 4 by increasing the rotation speed of the internal-combustion engine 4 to the second rotation speed NE2 higher than the first rotation speed NE1 by the motor 5 and the determination unit 62 determines whether to allow the second starting mode based on the predetermined vehicle starting condition (the EV stop state; the EV low-speed state, the EV sailing state, and the like) in the EV traveling state at the time of activating the vehicle 3 and determines whether to allow the second starting mode based on the EV traveling condition (the EV stop state, the EV low-speed state, the EV sailing state, and the like) different from the vehicle starting condition in the state of supplying the driving power to the vehicle wheel only by the motor 5.

For this reason, a condition of starting the internal-combustion engine 4 by the second starting mode is changed between the activation state and the EV traveling state of the vehicle 3. Accordingly it is possible to start the internal-combustion engine 4 by the second starting mode based on a state where the vehicle 3 is, for example, in a specific EV traveling state such as the EV stop state, the EV low-speed state, and the EV sailing state.

Further, the storage battery unit which includes the battery 9 serving as the storage battery supplying electric power to the motor 5 and the capacity acquiring unit 61 acquiring the usable capacity of the storage battery is further provided and the vehicle starting condition includes the usable capacity of the battery 9, and the EV traveling condition does not include the usable capacity of the battery 9.

For this reason, the vehicle 3 traveling in the EV traveling state satisfies a state where the value of state of charge (SOC) allows the EV traveling. Because of this assumption, a determination on whether the usable capacity of the battery 9 exists is not made in the determination on whether to start the internal-combustion engine 4 by the second starting mode. Accordingly, since the number of determination items using the ECU is reduced, it is possible to easily start the internal-combustion engine 4 in the second starting mode in response to the request of the driver in the vehicle 3 traveling in the EV traveling state.

Further, the traveling state acquiring unit 63 which acquires the traveling state of the vehicle 3 is further provided, a plurality of EV traveling conditions are provided, and an original EV traveling condition is set for each of the traveling states of the vehicle 3.

For this reason, it is determined whether to realize the starting of the internal-combustion engine 4 by the second starting mode in response to the EV traveling state of the vehicle 3. Accordingly, it is possible to easily use the starting of the internal-combustion engine 4 by the second starting mode in response to the request of the driver in various EV traveling states of the vehicle 3.

Further, a brake unit which includes a brake of the vehicle wheel Wr and a brake pedal operated in response to an operation amount and the speed sensor unit 93 which acquires the speed of the vehicle 3 are further provided and the EV traveling condition has a condition in which the brake pedal is operated and the speed of the vehicle 3 is 0.

For this reason, it is determined whether to realize the starting of the internal-combustion engine 4 by the second starting mode in the EV stop state of the vehicle 3. Accordingly, it is possible to realize the starting of the internal-combustion engine 4 by the second starting mode even in the EV stop state.

Further, the speed sensor unit (the vehicle speed sensor unit 93) which acquires the speed of the vehicle 3 and the acceleration of the vehicle 3 is further provided and the EV traveling condition has a condition in which the speed of the vehicle 3 is higher than 0 and is equal to or lower than a speed threshold value and the acceleration of the vehicle 3 is equal to or lower than an acceleration threshold value.

For this reason, it is determined whether to realize the starting of the internal-combustion engine 4 by the second starting mode in the EV low-speed traveling state of the vehicle 3. Accordingly, it is possible to realize the starting of the internal-combustion engine 4 by the second starting mode also in the EV low-speed state.

Further, an internal-combustion engine unit which includes the transmission 7 serving as the gear shifting unit changing an input of at least one of the internal-combustion engine 4 and the motor 5 in speed and outputs the input to the vehicle wheel Wr and the shift state acquiring unit 64 acquiring the gear shift state of the transmission 7 and the speed sensor unit (the vehicle speed sensor unit 93) which acquires the deceleration of the vehicle 3 are further provided and the EV traveling condition desirably has a condition in which the transmission 7 is in a neutral state and the deceleration of the vehicle 3 is equal to or lower than a deceleration threshold value.

For this reason, it is determined whether to realize the starting of the internal-combustion engine 4 by the second starting mode in the EV sailing state of the vehicle 3. Accordingly, it is possible to realize the starting of the internal-combustion engine 4 by the second starting mode also in the EV sailing state.

Further, the crank shaft of the internal-combustion engine 4 is directly connected to the output shaft of the motor 5 without the clutch. For this reason, it is possible to simply control the motor 5 by the ECU 6. Further, it is possible to more effectively generate the acoustic characteristic at the time of starting the internal-combustion engine 4 by the second starting mode. It is possible to suppress a vibration generated by the internal-combustion engine 4 and the motor 5.

The invention is not limited to the above-described embodiments and modifications and improvements in the range capable of achieving the object of the invention are included in the invention. For example, in the embodiment, the ECU 6 sets the second rotation speed NE2 to a constant value in a region in which the water temperature exceeds $TW_{thre2}$ (the second temperature), but the invention is not limited thereto. For example, the ECU 6 may set the second rotation speed NE2 to be equal to or higher than a predetermined lower-limit rotation speed and equal to or lower than a third rotation speed ES3 corresponding to a predetermined upper-limit rotation speed in a region in which the temperature of the cooling water exceeds $TW_{thre2}$ (the second temperature). Further, the value of the second rotation speed NE2 may be changed based on the operation mode.

Further, in the embodiment, the second rotation speed NE2 linearly increases accordance with an increase in water temperature when the water temperature is equal to or higher than a predetermined temperature $TW_{thre1}$ (a first temperature) and is equal to or lower than $TW_{thre2}$ (a second temperature), but the invention is not limited thereto. For example, when a difference between the second rotation speed NE2 and the first rotation speed NE1 set based on the temperature of the cooling water is a predetermined value or less, the ECU 6 sets the second rotation speed NE2 to be the same as the first rotation speed NE1 again and may control the motor 5 to prohibit the realization of the second starting mode.

Figure 12:
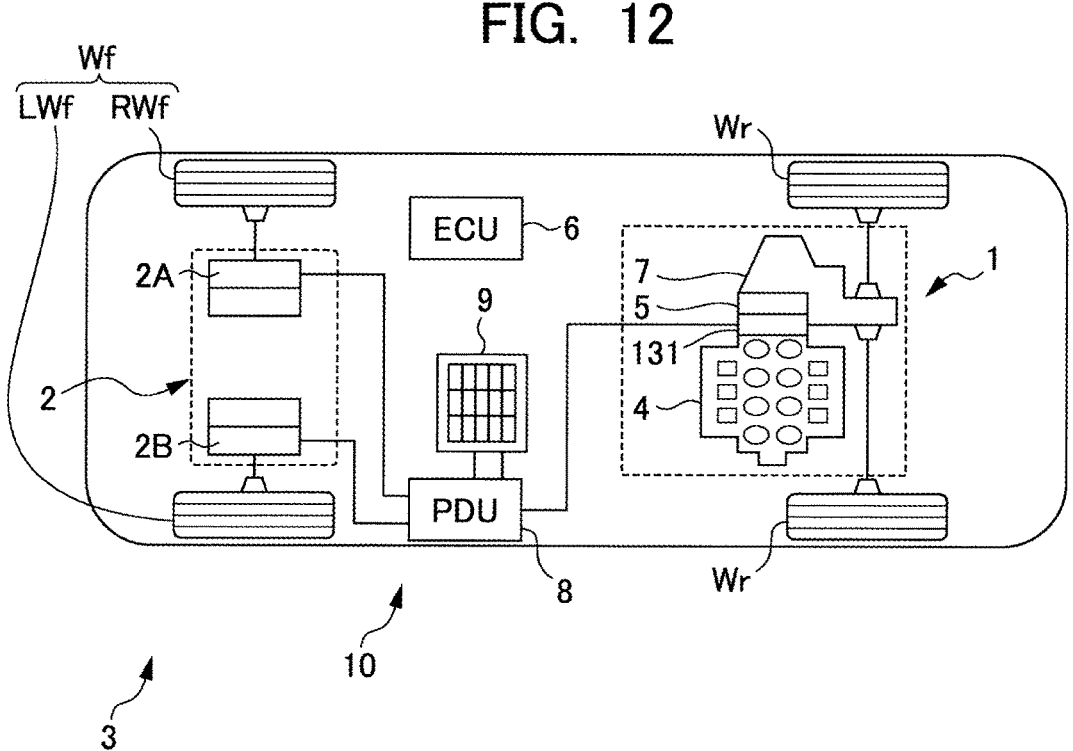
FIG. 12 is a diagram illustrating a vehicle 3A equipped with an internal-combustion engine starting device according to a modified example of the embodiment of the invention.

Further, in the embodiment, the crank shaft of the internal-combustion engine 4 is directly connected to the output shaft of the motor 5 without the clutch, but the invention is not limited thereto. For example, the crank shaft of the internal-combustion engine 4 and the output shaft of the motor 5 may be connected to each other through a clutch 131 as illustrated in FIG. 12. FIG. 12 is a diagram illustrating a vehicle 3A equipped with an internal-combustion engine starting device according to a modified example of the embodiment of the invention.

Figure 13:
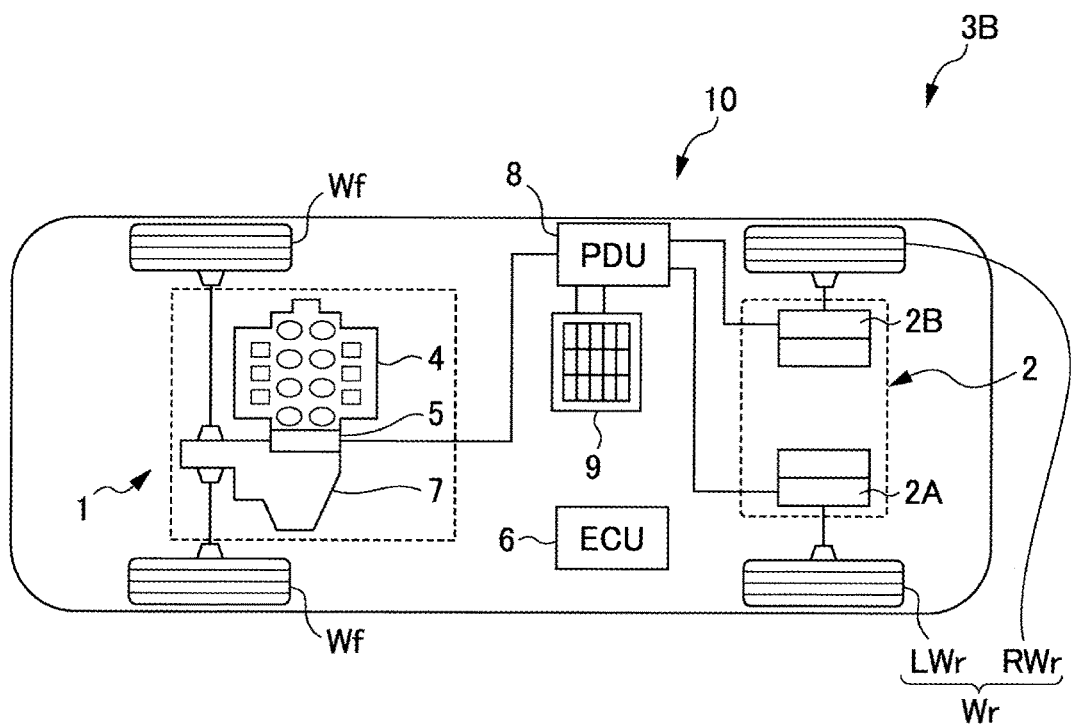
FIG. 13 is a diagram illustrating a vehicle 3B equipped with an internal-combustion engine starting device according to a modified example of the embodiment of the invention.

Further, in the embodiment, the vehicle 3 has a configuration in which the motor 5 or the internal-combustion engine 4 drives the rear wheel Wr and the front wheel Wf is driven by the motors 2A and 2B, but the invention is not limited to this configuration. For example, as illustrated in FIG. 13, the vehicle may have a configuration in which the motor 5 or the internal-combustion engine 4 drives the front wheel Wf and the rear wheel Wr is driven by the motors 2A and 2B different from the motor 5. FIG. 13 is a diagram illustrating a vehicle 3B equipped with an internal-combustion engine starting device according to a modified example of the embodiment of the invention.

Further, in the embodiment, the ECU 6 controls the motor 5 to prohibit the realization of the second starting mode in a region in which the water temperature is lower than the first temperature $TW_{thre1}$, but the invention is not limited thereto. For example, the EDU 6 serving as the control unit may control the motor 5 to prohibit the realization of the second starting mode in a region in which the temperature of the cooling water corresponding to the coolant is lower than the first temperature $TW_{thre1}$ by a predetermined temperature.

With this configuration, the realization of the second starting mode is prohibited in a region in which the temperature of the cooling water corresponding to the coolant is lower than the first temperature $TW_{thre1}$ by a predetermined temperature. Accordingly, it is possible to prohibit the internal-combustion engine 4 from starting with a high rotation despite the low temperature of the coolant and to protect the internal-combustion engine 4.

Further, the S/S starting (the second starting mode) may be prohibited when the operation mode is changed by the driver during the starting of the internal-combustion engine 4. Accordingly, it is possible to prevent a problem in which the driver cannot obtain an expected acoustic effect.

Further, the S/S starting may be prohibited when a failure occurs in at least one of the internal-combustion engine 4, the motor 5, and the battery 9. With such a configuration, it is possible to reliably prioritize the starting of the internal-combustion engine 4 compared to the S/S starting when a failure occurs in at least any one of the internal-combustion engine 4, the motor 5, and the battery 9.

EXPLANATION OF REFERENCE NUMERALS

3: vehicle
4: internal-combustion engine
5: motor
6: ECU (control unit)
7: transmission (gear shifting unit)
9: battery (storage battery)
61: capacity acquiring unit
62: determination unit
63: traveling state acquiring unit
64: shift state acquiring unit
65: limit rotation speed calculating unit
91: crank angle sensor (rotation speed acquiring unit)
92: water temperature sensor (temperature acquiring unit)
93: vehicle speed sensor unit (speed sensor unit)
110: ignition switch (starting unit)
112: starting mode selection switch (selection unit)
121: first mode
122: second mode
123: third mode
IN: idle rotation speed
NE1: first rotation speed
NE2: second rotation speed $TW_{thre1}$: temperature (first temperature)
$TW_{thre2}$: temperature (second temperature)
Wr: vehicle wheel

The invention claimed is:
1. An internal-combustion engine starting device comprising: an internal-combustion engine unit which includes an internal-combustion engine, a cooling unit cooling the internal-combustion engine by a coolant, a temperature acquiring unit acquiring a temperature of the coolant, and a rotation speed acquiring unit acquiring a rotation speed of the internal-combustion engine; and a motor unit which includes a motor starting the internal-combustion engine and a control unit controlling the motor, wherein the control unit controls the motor to realize a first starting mode of starting the internal-combustion engine by increasing the rotation speed of the internal-combustion engine to a predetermined first rotation speed by the motor and subsequently converging the rotation speed to an idle rotation speed, and a second starting mode of starting the internal-combustion engine by increasing the rotation speed of the internal-combustion engine to a second rotation speed set higher than the first rotation speed and set based on the temperature of the coolant by the motor and subsequently converging the rotation speed to the idle rotation speed, the control unit controls the motor to prohibit the realization of the second starting mode in a region in which the temperature of the coolant is lower than a first temperature, and wherein the control unit controls the motor to set a rotation speed difference between the first rotation speed and the second rotation speed to a value based on the temperature of the coolant; wherein the control unit controls the motor to prohibit the realization of the second starting mode when a difference between the second rotation speed and the first rotation speed set based on the temperature of the coolant is a predetermined value or less.

2. The internal-combustion engine starting device according to claim 1,
wherein the control unit increases and sets the second rotation speed based on the temperature of the coolant in a region in which the temperature of the coolant is equal to or higher than a predetermined first temperature and is equal to or lower than a second temperature higher than the first temperature.

3. The internal-combustion engine starting device according to claim 2,
wherein the control unit sets the second rotation speed to a constant value in a region in which the temperature of the coolant exceeds the second temperature.

4. The internal-combustion engine starting device according to claim 2,
wherein the control unit sets the second rotation speed to be equal to or higher than a predetermined lower-limit rotation speed and to be equal to or lower than a predetermined upper-limit rotation speed in a region in which the temperature of the coolant exceeds the second temperature.

5. The internal-combustion engine starting device according to claim 2, further comprising:
an electric power storage unit which includes an electric power storage unit outputting electric power to the motor and a limit rotation speed calculating unit calculating a limit rotation speed of the motor based on an electric power output limit value of the electric power storage unit,
wherein the control unit controls the motor so that an increase degree of the second rotation speed becomes smaller than an increase degree of the limit rotation speed in a region in which the temperature of the coolant is equal to or higher than the first temperature and equal to or lower than the second temperature.

6. The internal-combustion engine starting device according to claim 1,
wherein the internal-combustion engine supplies driving power to a vehicle wheel of a vehicle,
the internal-combustion engine starting device further comprises a selection unit which changes an operation characteristic of the vehicle, and
the control unit sets the second rotation speed based on the operation characteristic of the vehicle.

7. A vehicle comprising:
the internal-combustion engine starting device according to claim 1.

* * * * *